United States Patent
Takeuchi et al.

(10) Patent No.: US 10,275,447 B2
(45) Date of Patent: *Apr. 30, 2019

(54) DETECTING DANGEROUS EXPRESSIONS BASED ON A THEME

(71) Applicant: International Business Machines Corporation, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,563

(22) Filed: Dec. 12, 2016

(65) Prior Publication Data

US 2017/0091172 A1   Mar. 30, 2017

Related U.S. Application Data

(63) Continuation of application No. 14/460,443, filed on Aug. 15, 2014, now Pat. No. 9,575,959.

(30) Foreign Application Priority Data

Oct. 3, 2013   (JP) ................................ 2013-208264

(51) Int. Cl.
    *G06F 17/27*   (2006.01)
(52) U.S. Cl.
    CPC ...... *G06F 17/2765* (2013.01); *G06F 17/2735* (2013.01)
(58) Field of Classification Search
    CPC .......... G06F 17/20; G06F 17/21; G06F 17/27; G06F 17/2765; G06F 17/30; G06F 17/3061

(Continued)

(56) References Cited

U.S. PATENT DOCUMENTS

| 6,161,130 A | 12/2000 | Horvitz et al. |
| 7,444,403 B1 | 10/2008 | Packer et al. |

(Continued)

FOREIGN PATENT DOCUMENTS

| JP | H0477857 A | 3/1992 |
| JP | 2006146567 A | 6/2006 |

(Continued)

OTHER PUBLICATIONS

Decision to Grant a Patent, Application No. 2013-208264. dated Mar. 25, 2016. Translated Dec. 10, 2016. 6 pages.

(Continued)

*Primary Examiner* — Paras D Shah
(74) *Attorney, Agent, or Firm* — Stosch Sabo

(57) ABSTRACT

Embodiments relate to a type of expression based on a particular theme. An aspect includes acquiring, by an electronic apparatus, from text data for learning, a subset of the text data associated with the particular theme and with particular time period information. Another aspect includes extracting text data containing negative information from the acquired subset of the text data. Another aspect includes extracting a word or phrase having a high correlation with the extracted text data or a word or phrase having a high appearance frequency in the extracted text data from the extracted text data. Yet another aspect includes determining that the extracted word or phrase is the type of expression based on the particular theme.

18 Claims, 13 Drawing Sheets

(58) Field of Classification Search
USPC ............................ 704/9; 707/705, 708, 899
See application file for complete search history.

(56) References Cited

U.S. PATENT DOCUMENTS

| | | |
|---|---|---|
| 7,756,843 B1 | 7/2010 | Palmer |
| 8,463,595 B1 | 6/2013 | Rehling et al. |
| 2005/0289148 A1 | 12/2005 | Dorner et al. |
| 2006/0112134 A1 | 5/2006 | Tsuboi et al. |
| 2007/0010993 A1 | 1/2007 | Bachneko et al. |
| 2007/0067291 A1 | 3/2007 | Kolo et al. |
| 2008/0133221 A1* | 6/2008 | Smith ................. G06F 17/2745 704/9 |
| 2008/0294439 A1 | 11/2008 | Kirby |
| 2009/0089417 A1 | 4/2009 | Giffin et al. |
| 2009/0157747 A1* | 6/2009 | McLean ............ G06F 17/30038 |
| 2010/0287182 A1 | 11/2010 | Brooks et al. |
| 2011/0191097 A1 | 8/2011 | Spears |
| 2011/0191105 A1 | 8/2011 | Spears |
| 2011/0208511 A1* | 8/2011 | Sikstrom ............ G06F 17/2785 704/9 |
| 2011/0320543 A1* | 12/2011 | Bendel ................ G06F 17/2229 709/206 |
| 2012/0159315 A1* | 6/2012 | Chakra ............... G06F 17/2705 715/255 |
| 2013/0046531 A1 | 2/2013 | Chandramouli et al. |
| 2013/0110748 A1 | 5/2013 | Talati et al. |
| 2013/0138428 A1 | 5/2013 | Chandramouli et al. |
| 2014/0074842 A1 | 3/2014 | Tal et al. |
| 2014/0278367 A1* | 9/2014 | Markman ........... G06F 17/2765 704/9 |
| 2014/0283048 A1 | 9/2014 | Howes et al. |
| 2014/0283055 A1 | 9/2014 | Zahran |
| 2014/0304814 A1 | 10/2014 | Ott et al. |
| 2015/0096041 A1 | 4/2015 | Bommireddipalli et al. |
| 2015/0100306 A1 | 4/2015 | Takeuchi et al. |

FOREIGN PATENT DOCUMENTS

| | | |
|---|---|---|
| JP | 4097602 B2 | 6/2008 |
| JP | 2008158735 A | 7/2008 |
| JP | 2008165284 A | 7/2008 |
| JP | 2008165599 A | 7/2008 |
| JP | 2008191911 A | 8/2008 |
| JP | 2008234090 A | 10/2008 |
| JP | 2009015866 A | 1/2009 |
| JP | 4242892 B2 | 3/2009 |
| JP | 92010234171 A | 10/2010 |
| JP | 5013065 B2 | 8/2012 |
| JP | 51688961 B2 | 3/2013 |
| WO | WO03046764 A1 | 6/2003 |

OTHER PUBLICATIONS

JP Office Action; Notification of Reasons for Refusal, Application No. 2013-208264. dated Feb. 2, 2016. Translated Dec. 10, 2016. 4 pages.

* cited by examiner

FIG. 3

A. GROUP OF ORIGINAL DATA OF "TEXT DATA WITH LABEL FOR CONTEXT LEARNING" (301)

- 311: I go and buy a cup noodle because I'm hungry.
- 312: When you send a donation to the Tohoku district, please check its intended purpose. #earthquake
- 313: My work shifts in golden week have already decided. #part-time job
- 314: I went to a store to find that water was really sold out. Everyone bought too much water. #earthquake
- 315: I heard that a friend joined a volunteer activity for dirt shoveling in disaster-stricken area. #reconstruction assistance

B. INPUT TO LEARNING MACHINE (321)

- 331:
  - hungry 1
  - cup noodle 1
  - buy 1
- 332:
  - Tohoku district 1
  - donation 1
  - send 1
  - when 1
  - ... [342: earthquake]
- 333:
  - already 1
  - golden week 1
  - work shift 1
- 334:
  - store 1
  - go 1
  - really 1
  - water 2
  - ... [344: earthquake]
- 335:
  - friend 1
  - disaster-stricken area 1
  - dirt 1
  - shovel 1
  - ... [345: earthquake]

501

511 交通の混乱で支援が遅れたら問題ですね。

512 都内で電池を買い占めるのは、支援物資の面でも迷惑になりかねません。

513 若い夫婦が電池を全部買っていた。これはやめてほしいな。

514 義援金サイトの詐欺にご注意ください。

515 助け合いムードでも、スーパーで電池が大量買いされるという現実は悲しい。

521

531 One possible problem is that traffic jam causes a delay in the delivery of supplies.

532 Buying too many batteries in Tokyo can prevent aid from providing electricity.

533 A young couple bought all the batteries in a store. People should really stop doing this.

534 Watch out for fake donation web sites.

535 No matter how much people try to help each other, it is a sad fact that some people bought up all the batteries in stores.

FIG. 5

DETECTING DANGEROUS EXPRESSIONS BASED ON A THEME

BACKGROUND

The present disclosure relates to a technique for detecting an expression that can be a dangerous expression based on a particular theme. Various embodiments also relates to a technique for detecting an expression that can be a dangerous expression based on a particular theme and a particular period.

The popularization of smartphones and tablets is allowing individual persons to easily send information through, for example, social networking services (SNS) (for example, Facebook®, or Twitter®. Such information includes various types of information ranging from information in an everyday conversation level to information having serious influences once scattered on the Internet. Examples of the information having serious influences include uncertain information, incorrect information, confidential information, such information that maliciously slanders third parties, corporations, or nations, such information that hinders corporate activities or election campaigns, and such information that evokes a sign of foul play.

It is almost impossible to delete information once it has been scattered on the Internet. Accordingly, how to manage that information having serious influences is published on the Internet is becoming an issue.

SUMMARY

Embodiments relate to a dangerous expression based on a particular theme. An aspect includes acquiring, by an electronic apparatus, from text data for learning, a subset of the text data associated with the particular theme and with particular time period information. Another aspect includes extracting text data containing negative information from the acquired subset of the text data. Another aspect includes extracting a word or phrase having a high correlation with the extracted text data or a word or phrase having a high appearance frequency in the extracted text data from the extracted text data. Yet another aspect includes determining that the extracted word or phrase is the dangerous expression based on the particular theme.

Additional features and advantages are realized through the techniques of various embodiments. Other embodiments and aspects of the invention are described in detail herein and are considered a part of the claimed invention. For a better understanding of the invention with the advantages and the features, refer to the description and to the drawings.

DRAWINGS

Various embodiments will now be described, by way of example only, with reference to the following drawings in which:

FIG. 1A is a diagram illustrating an example of a hardware configuration for implementing an electronic apparatus (a first electronic apparatus or a second electronic apparatus) usable in an embodiment, in which the electronic apparatus is, for example, a computer;

FIG. 1B is a diagram illustrating an example of the hardware configuration for implementing the electronic apparatus (the first electronic apparatus or the second electronic apparatus) usable in the embodiment, in which the electronic apparatus is, for example, a tablet terminal, a smartphone, a mobile phone, a personal digital assistant (PDA), a medical equipment terminal, a game terminal, a car navigation system, a portable navigation system, or a kiosk terminal;

FIG. 3 illustrates a model diagram for creating a learned learning model used to identify the text data associated with the particular theme from the text data for learning, in the processing of the dangerous expression learning phase according to the embodiment;

FIG. 5 illustrates a model diagram for identifying a word or phrase that falls under negative information, extracting text data containing the negative information, and extracting an expression that can be a dangerous expression based on a particular theme, from the extracted data, in the processing of the dangerous expression learning phase according to the embodiment;

Figure 10:
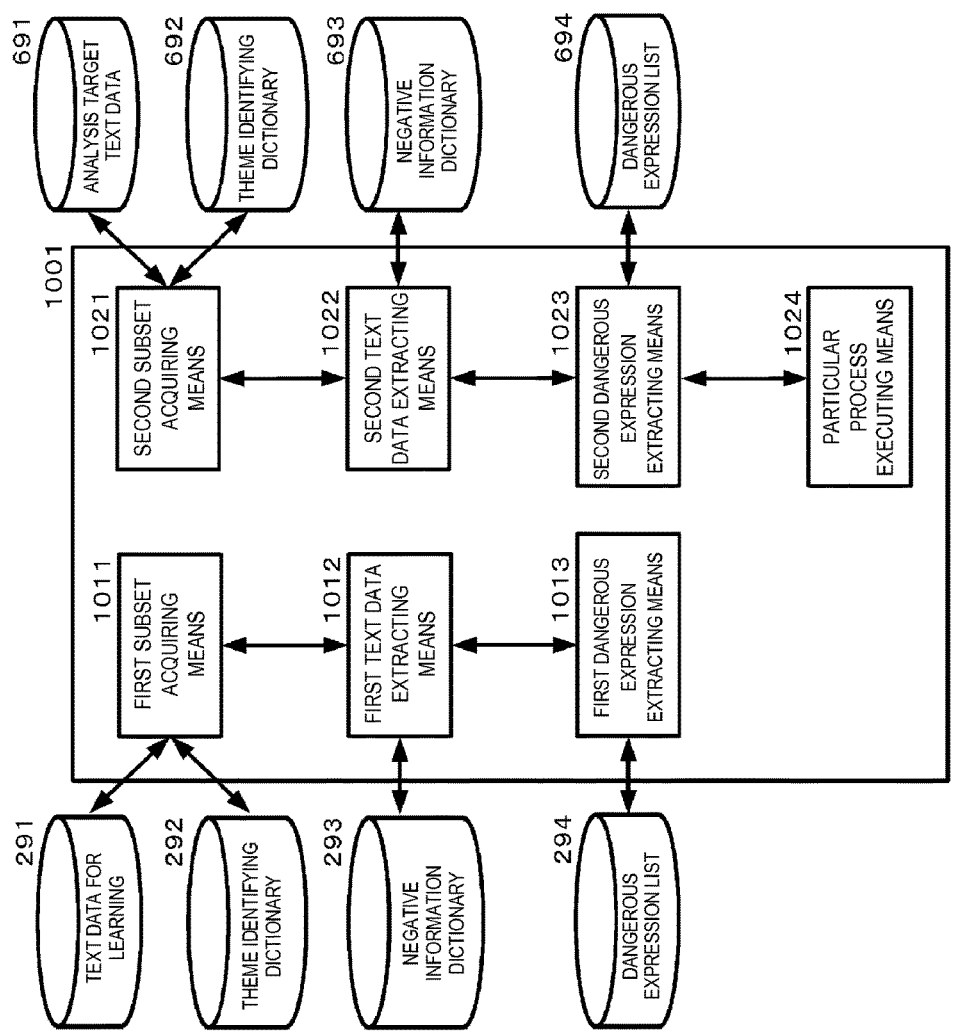
Figure 11:
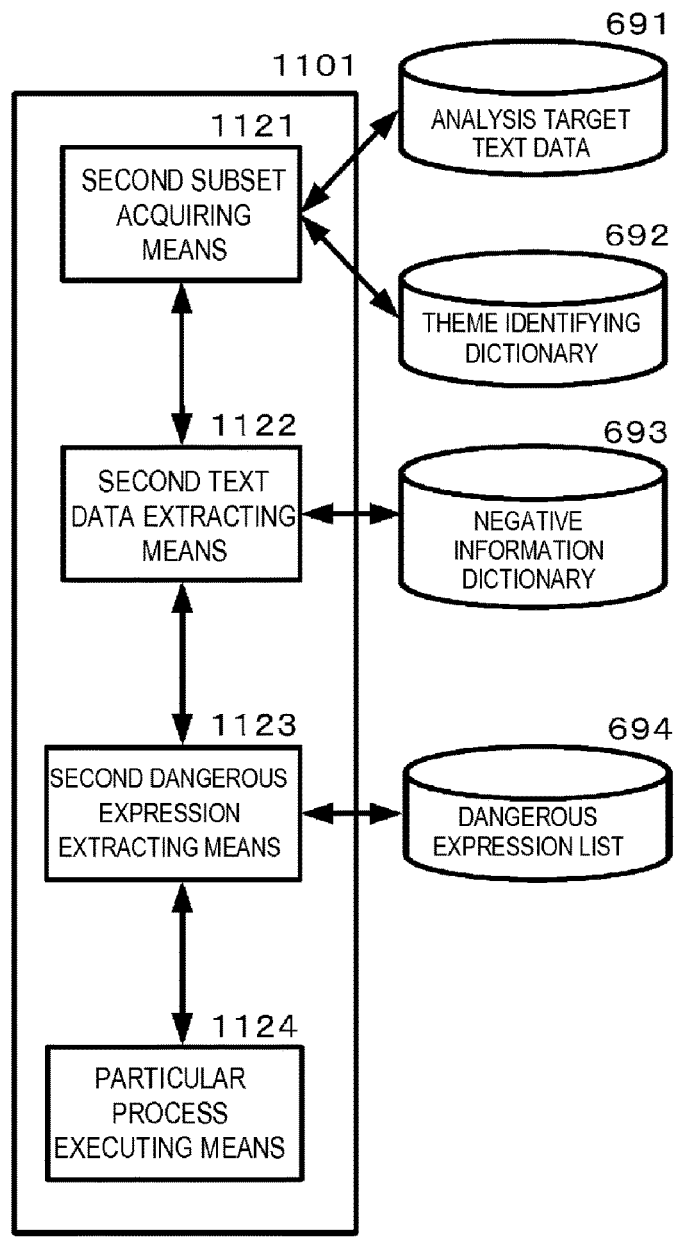

FIG. 10 is a diagram illustrating an example of functional blocks of the first electronic apparatus having the hardware configuration illustrated in FIG. 1, the first electronic apparatus executing the processing of the dangerous expression learning phase according to various embodiments and arbitrarily executing the processing of the dangerous expression detecting phase according to the embodiment; and FIG. 11 is a diagram illustrating an example of functional blocks of the second electronic apparatus having the hardware configuration illustrated in FIG. 1, the second electronic apparatus executing the processing of the dangerous expression detecting phase according to the embodiment.

DETAILED DESCRIPTION OF THE EMBODIMENTS

Embodiments disclosed herein relate to detecting of danger our expressions based on a theme, or subject. The text data associated with the particular theme may be text data having a context associated with the particular theme. Examples of the particular theme, or subject, include: an earthquake disaster, reconstruction, power saving, an earthquake, and seismic sea waves (tsunami); a product name or service name of a particular corporation; and terms concerning confidential information, but the particular theme is not limited thereto. For example, the term "earthquake" and the term "reconstruction" can be used to identify the context of the particular theme "earthquake". The theme identifying dictionary (292) includes words or phrases used for the particular theme.

Even in the case where a given word or phrase is not negative information in terms of the superficial impression of its characters (for example, a word or phrase that can be determined as a malicious slander from the superficial impression of its characters), the given word or phrase can be a dangerous expression in some cases if the given word or phrase is used in a context relating to a particular theme, or is used in a context relating to a particular theme in a particular period.

For example, it is assumed that a commentator insists on the importance of reconstruction assistance after an earthquake. It is also assumed that a user writes a comment that "the commentator bought too many batteries in a convenience store" on an electronic bulletin board. However, it is assumed that the contents of the comment are false or that the given user confuses the given commentator with someone else. Under such circumstances, eventually, the comment may lower the reputation of the commentator or may fall under defamation of the commentator, regardless of whether or not the contents of the comment of the user are true.

Further, for example, a comment about a product of a corporation or a comment about supports or services of a corporation, a public institution, or a restaurant may lower the reputation of the corporation, the public institution, or the restaurant in some cases based on the contents thereof and the period during which the comment is written, similarly to the above.

Further, for example, a comment about a nation, a community, or a particular person (for example, an election candidate, a co-worker, or a friend) may lower the reputation of the nation, the community, or the particular person, or may become a source of trouble or legally problematic in some cases based on the contents thereof and the period during which the comment is written, similarly to the above.

Accordingly, for example, for both SNS managers and SNS users, it is important to detect: not only words or phrases that can be determined as malicious slanders from the superficial impressions of their characters; but also words or phrases that can be dangerous expressions based on a particular theme or based on a particular theme and a particular period, and enable management of posting of the detected dangerous expressions.

In view of the above, embodiments may detect a word or phrase that can be a dangerous expression based on a particular theme. Embodiments may also detect a word or phrase that can be a dangerous expression based on a particular theme and a particular period.

Embodiments provide a technique for detecting an expression that can be a dangerous expression based on a particular theme. The technique includes a method for detecting an expression that can be a dangerous expression based on a particular theme, an electronic apparatus and an electronic apparatus system for detecting an expression that can be a dangerous expression based on a particular theme, a program for the electronic apparatus, and a program product for the electronic apparatus.

Aspects of the various embodiments include (1) a dangerous expression learning phase and (2) a dangerous expression detecting phase described below: (1) in the dangerous expression learning phase, the electronic apparatus extracts an expression that can be a dangerous expression based on a particular theme, using text data for learning, and creates a dangerous expression list; and (2) in the dangerous expression detecting phase, the electronic apparatus detects whether or not an expression that can be a dangerous expression based on a particular theme exists in text data to be analyzed, using the dangerous expression list created in the dangerous expression learning phase.

In various embodiments, the dangerous expression learning phase may be carried out by a first electronic apparatus, and the dangerous expression detecting phase may be carried out by a second electronic apparatus different from the first electronic apparatus. Alternatively, the dangerous expression learning phase and the dangerous expression detecting phase may be carried out by the same electronic apparatus (for example, the first electronic apparatus).

In the case where the first electronic apparatus carries out the dangerous expression learning phase, in a first aspect of a dangerous expression learning phase of various embodiments, a method for detecting an expression that can be a dangerous expression based on a particular theme includes performing by the first electronic apparatus: acquiring a subset of text data associated with the particular theme and arbitrarily with particular time period information, from text data for learning; extracting text data containing negative information from the acquired subset; and extracting (1) a word or phrase having a high correlation with the extracted text data or (2) a word or phrase having a high appearance frequency in the extracted text data, from the extracted text data, as the expression that can be the dangerous expression based on the particular theme.

In the case where the first electronic apparatus carries out the dangerous expression detecting phase, in a second aspect of a dangerous expression detecting phase of various embodiments, a method for detecting an expression that can be a dangerous expression based on a particular theme includes performing by the first electronic apparatus: acquiring a subset of text data associated with the particular theme from text data to be analyzed; and detecting that the expression that can be the dangerous expression exists in the subset acquired from the text data to be analyzed.

In the second aspect of the dangerous expression detecting phase of various embodiments, the method for detecting the expression that can be the dangerous expression based on the particular theme further includes a block executed by the first electronic apparatus, of extracting text data containing negative information from the subset acquired from the text data to be analyzed. The block of detecting that the expression that can be the dangerous expression exists in the subset acquired from the text data to be analyzed may include a block of detecting that the expression that can be the dangerous expression exists in the text data extracted from the text data to be analyzed.

In the case where the second electronic apparatus carries out the dangerous expression detecting phase, in a third aspect of a dangerous expression detecting phase of various embodiments, a method for detecting an expression that can be a dangerous expression based on a particular theme includes performing by the second electronic apparatus: acquiring a subset of text data associated with the particular theme from text data to be analyzed; and detecting that the expression that can be the dangerous expression exists in the subset acquired from the text data to be analyzed.

In the third aspect of the dangerous expression detecting phase of various embodiments, the method for detecting the expression that can be the dangerous expression based on the particular theme further includes a block, executed by the second electronic apparatus, of extracting text data containing negative information from the subset acquired from the text data to be analyzed. The block of detecting that the expression that can be the dangerous expression exists in the subset acquired from the text data to be analyzed may include a block of detecting that the expression that can be the dangerous expression exists in the text data extracted from the text data to be analyzed.

In the case where the first electronic apparatus carries out the dangerous expression learning phase, in a fourth aspect of a dangerous expression learning phase of various embodiments, the first electronic apparatus for detecting an expression that can be a dangerous expression based on a particular theme includes: first subset acquiring means for acquiring a subset of text data associated with the particular theme and arbitrarily with particular time period information, from text data for learning; first text data extracting means for extracting text data containing negative information from the subset acquired by the first subset acquiring means; and first dangerous expression extracting means for extracting (1) a word or phrase having a high correlation with the extracted text data or (2) a word or phrase having a high appearance frequency in the extracted text data, from the text data extracted by the text data extracting means, as the expression that can be the dangerous expression based on the particular theme.

In the fourth aspect of the dangerous expression learning phase of various embodiments, in the first electronic apparatus, the first subset acquiring means can identify text data associated with the particular theme, using a theme identifying dictionary including words or phrases used for the particular theme.

In the fourth aspect of the dangerous expression learning phase of various embodiments, in the first electronic apparatus, the first subset acquiring means can identify, as text data associated with the particular theme (referred to as text data 1): a range of a predetermined number of characters or a predetermined number of words before and after a word or phrase that exists in the text data for learning and is included in the theme identifying dictionary; or the same sentences, paragraphs, items, or documents including text data containing a word or phrase included in the theme identifying dictionary.

In the fourth aspect of the dangerous expression learning phase of various embodiments, in the first electronic apparatus, the first subset acquiring means can identify text data associated with the particular theme (referred to as text data 2), from the text data for learning, using a learned learning model. In the fourth aspect of the dangerous expression learning phase of various embodiments, in the first electronic apparatus, the first subset acquiring means con acquire the subset of text data associated with the particular theme, by performing a set operation (for example, intersection or union) on at least two of the text data 1, the text data 2, and text data associated with the particular time period information.

In the fourth aspect of the dangerous expression learning phase of various embodiments, in the first electronic apparatus, the first text data extracting means can identify a word or phrase that falls under the negative information, in the subset acquired by the first subset acquiring means, and can extract text data containing the identified word or phrase. In the fourth aspect of the dangerous expression learning phase of various embodiments, in the first electronic apparatus, the first text data extracting means can identify a word or phrase that falls under the negative information, in the subset acquired by the first subset acquiring means, using a negative information dictionary including words or phrases determinable as the negative information.

In the fourth aspect of the dangerous expression learning phase of various embodiments, in the first electronic apparatus, the first text data extracting means can extract text data containing a word or phrase that falls under the negative information, from the subset acquired by the first subset acquiring means, using a learned machine learning model. In the fourth aspect of the dangerous expression learning phase of various embodiments, in the first electronic apparatus, the first dangerous expression extracting means can store the extracted dangerous expression into a dangerous expression list. In the fourth aspect of the dangerous expression learning phase of various embodiments, in the first electronic apparatus, the first dangerous expression extracting means can further extract the particular theme.

In the case where the first electronic apparatus carries out the dangerous expression detecting phase, in a fifth aspect of a dangerous expression detecting phase of various embodiments, in the first electronic apparatus, the first subset acquiring means can further acquire a subset of text data associated with the particular theme from text data to be analyzed, and the first dangerous expression extracting means can further detect that the expression that can be the dangerous expression exists in the subset acquired by the first subset acquiring means from the text data to be analyzed.

In the fifth aspect of the dangerous expression detecting phase of various embodiments, in the first electronic apparatus, the first subset acquiring means can identify text data associated with the particular theme, using a theme identifying dictionary including words or phrases used for the particular theme. In the fifth aspect of the dangerous expression detecting phase of various embodiments, in the first electronic apparatus, the first subset acquiring means can identify, as text data associated with the particular theme (referred to as text data 1): a range of a predetermined number of characters or a predetermined number of words before and after a word or phrase that exists in the text data to be analyzed and is included in the theme identifying dictionary; or the same sentence, paragraph, item, or document including text data containing a word or phrase included in the theme identifying dictionary.

In the fifth aspect of the dangerous expression detecting phase of various embodiments, in the first electronic apparatus, the first subset acquiring means can identify text data associated with the particular theme (referred to as text data 2), from the text data to be analyzed, using a learned learning model. In the fifth aspect of the dangerous expression detecting phase of various embodiments, in the first electronic apparatus, the first subset acquiring means con acquire the subset of text data associated with the particular theme, by performing a set operation (for example, intersection or union) on at least two of the text data 1, the text data 2, and text data associated with the particular time period information. In the fifth aspect of the dangerous expression detecting phase of various embodiments, in the first electronic apparatus, the first text data extracting means can identify a word or phrase that falls under the negative information, in the subset acquired by the first subset acquiring means, and can extract text data containing the identified word or phrase.

In the fifth aspect of the dangerous expression detecting phase of various embodiments, in the first electronic apparatus, the first text data extracting means can further extract text data containing negative information from the subset that is acquired by the first subset acquiring means from the text data to be analyzed, and the first dangerous expression extracting means can further detect that the expression that can be the dangerous expression exists in the text data that is extracted by the first text data extracting means from the text data to be analyzed. In the fifth aspect of the dangerous expression detecting phase of various embodiments, in the first electronic apparatus, the first text data extracting means can identify a word or phrase that falls under the negative information, in the subset acquired by the first subset acquiring means, and can extract text data containing the identified word or phrase. In the fifth aspect of the dangerous expression detecting phase of various embodiments, in the first electronic apparatus, the first text data extracting means can identify a word or phrase that falls under the negative information, in the subset acquired by the first subset acquiring means, using a negative information dictionary including words or phrases determinable as the negative information.

In the fifth aspect of the dangerous expression detecting phase of various embodiments, in the first electronic apparatus, the first text data extracting means can extract text data containing a word or phrase that falls under the negative information, from the subset acquired by the first subset acquiring means, using a learned machine learning model.

In the fifth aspect of the dangerous expression detecting phase of various embodiments, in the first electronic apparatus, the first dangerous expression extracting means can further extract the particular theme. In the fifth aspect of the dangerous expression detecting phase of various embodiments, the first electronic apparatus may further include particular process executing means for further executing at least one of: stopping or suspending transmission or upload of the text data to be analyzed onto a network, based on the fact that the expression that can be the dangerous expression exists; displaying, on a screen, an indication that the text data to be analyzed contains the dangerous expression, based on the fact that the expression that can be the dangerous expression exists; transmitting a message that the text data to be analyzed contains the dangerous expression, to an electronic apparatus of a user that has provided the text data to be analyzed, based on the fact that the expression that can be the dangerous expression exists; and displaying, on the screen, the particular theme and the number of times of appearance of the expression that can be the dangerous expression, based on the fact that the expression that can be the dangerous expression exists.

In the case where the second electronic apparatus carries out the dangerous expression detecting phase, in a sixth aspect of the dangerous expression detecting phase of various embodiments, the second electronic apparatus includes: second subset acquiring means for acquiring a subset of text data associated with the particular theme from text data to be analyzed; and second dangerous expression detecting means for detecting that the expression that can be the dangerous expression extracted by the first dangerous expression extracting means of the first electronic apparatus exists in the subset acquired by the second subset acquiring means.

In the sixth aspect of the dangerous expression detecting phase of various embodiments, in the second electronic apparatus, the second subset acquiring means can identify text data associated with the particular theme, using a theme identifying dictionary including words or phrases used for the particular theme. In the sixth aspect of the dangerous expression detecting phase of various embodiments, in the second electronic apparatus, the second subset acquiring means can identify, as text data associated with the particular theme (referred to as text data 1): a range of a predetermined number of characters or a predetermined number of words before and after a word or phrase that exists in the text data to be analyzed and is included in the theme identifying dictionary; or the same sentence, paragraph, item, or document including text data containing a word or phrase included in the theme identifying dictionary.

In the sixth aspect of the dangerous expression detecting phase of various embodiments, in the second electronic apparatus, the second subset acquiring means can identify text data associated with the particular theme (referred to as text data 2), from the text data to be analyzed, using a learned learning model. In the sixth aspect of the dangerous expression detecting phase of various embodiments, in the second electronic apparatus, the second subset acquiring means con acquire the subset of text data associated with the particular theme, by performing a set operation (for example, intersection or union) on at least two of the text data 1, the text data 2, and text data associated with the particular time period information.

In the sixth aspect of the dangerous expression detecting phase of various embodiments, in the second electronic apparatus, the second text data extracting means can identify a word or phrase that falls under the negative information, in the subset acquired by the second subset acquiring means, and can extract text data containing the identified word or phrase. In the sixth aspect of the dangerous expression detecting phase of various embodiments, the second electronic apparatus further includes the second text data extracting means for extracting text data containing negative information from the subset acquired by the second subset acquiring means, and the second dangerous expression detecting means can detect that the expression that can be the dangerous expression exists in the text data extracted by the second text data extracting means.

In the sixth aspect of the dangerous expression detecting phase of various embodiments, in the second electronic apparatus, the second text data extracting means can identify a word or phrase that falls under the negative information, in the subset acquired by the second subset acquiring means, and can extract text data containing the identified word or phrase. In the sixth aspect of the dangerous expression detecting phase of various embodiments, in the second electronic apparatus, the second text data extracting means can identify a word or phrase that falls under the negative information, in the subset acquired by the second subset acquiring means, using a negative information dictionary including words or phrases determinable as the negative information.

In the sixth aspect of the dangerous expression detecting phase of various embodiments, in the second electronic apparatus, the second text data extracting means can extract text data containing a word or phrase that falls under the negative information, from the subset acquired by the second subset acquiring means, using a learned machine learning model. In the sixth aspect of the dangerous expression detecting phase of various embodiments, in the second electronic apparatus, the second dangerous expression extracting means can further extract the particular theme.

In the sixth aspect of the dangerous expression detecting phase of various embodiments, the second electronic apparatus may further include particular process executing means for further executing at least one of: stopping or suspending transmission or upload of the text data to be analyzed onto a network, based on the fact that the expression that can be the dangerous expression exists; displaying, on a screen, an indication that the text data to be analyzed contains the dangerous expression, based on the fact that the expression that can be the dangerous expression exists; transmitting a message that the text data to be analyzed contains the dangerous expression, to an electronic apparatus of a user that has provided the text data to be analyzed, based on the fact that the expression that can be the dangerous expression exists; and displaying, on the screen, the particular theme and the number of times of appearance of the expression that can be the dangerous expression, based on the fact that the expression that can be the dangerous expression exists.

In the case of an electronic apparatus system in which the first electronic apparatus carries out the dangerous expression learning phase, and the second electronic apparatus carries out the dangerous expression detecting phase, in a seventh aspect of various embodiments, an electronic apparatus system for detecting an expression that can be a dangerous expression based on a particular theme includes: the first electronic apparatus for carrying out the dangerous expression learning phase; and the second electronic apparatus for carrying out the dangerous expression detecting phase. The first electronic apparatus includes: first subset acquiring means for acquiring a subset of text data associated with the particular theme and arbitrarily with particular time period information, from text data for learning; first text data extracting means for extracting text data containing negative information from the acquired subset; and first dangerous expression extracting means for extracting (1) a word or phrase having a high correlation with the extracted text data or (2) a word or phrase having a high appearance frequency in the extracted text data, from the extracted text data, as the expression that can be the dangerous expression based on the particular theme. The second electronic apparatus includes: second subset acquiring means for accruing a subset of text data associated with the particular theme from text data to be analyzed; and second dangerous expression detecting means for detecting that the expression that can be the dangerous expression extracted by the first dangerous expression extracting means exists in the subset acquired by the second subset acquiring means.

In the seventh aspect of various embodiments, the second electronic apparatus for carrying out the dangerous expression detecting phase further includes second text data extracting means for extracting text data containing negative information from the subset acquired by the second subset acquiring means, and the second dangerous expression detecting means can detect that the expression that can be the dangerous expression exists in the text data extracted by the second text data extracting means.

In the case of a program for an electronic apparatus, causing the first electronic apparatus to carry out the dangerous expression learning phase and the dangerous expression detecting phase, in an eighth aspect of various embodiments, a program for an electronic apparatus (for example, a computer program) or a program product for an electronic apparatus (for example, a computer program product) for detecting an expression that can be a dangerous expression based on a particular theme causes the first electronic apparatus to execute each block in the method according to the first aspect, and arbitrarily causes the first electronic apparatus to execute each block in the method according to the second aspect.

In a ninth aspect of various embodiments, a program for an electronic apparatus or a program product for an electronic apparatus for detecting an expression that can be a dangerous expression based on a particular theme causes the first electronic apparatus to execute each block in the method according to the first aspect, and arbitrarily causes the second electronic apparatus to execute each block in the method according to the third aspect.

The program for an electronic apparatus according to each of the eighth and ninth aspects of various embodiments may be stored in one or more arbitrary electronic-apparatus-readable recording media (for example, computer-readable recording media) such as flexible disks, MOs, CD-ROMs, DVDs, BDs, hard disk devices, memory media connectable to USBs, ROMs, MRAMs, and RAMs. In order to store the program for an electronic apparatus into such recording media, the program for an electronic apparatus may be downloaded from another electronic apparatus (for example, a server computer) connected by a communication line, or may be copied from another recording medium. Further, the program for an electronic apparatus according to each of the aspects of various embodiments may be compressed or divided into a plurality of pieces to be stored into one or more recording media. Further, it should be noted that the program product for an electronic apparatus according to each of the aspects of various embodiments may be provided in various modes, as a matter of course. The program product for an electronic apparatus according to each of the aspects of various embodiments may include, for example, a storage medium in which the program for an electronic apparatus is recorded or a transmission medium for transmitting the program for an electronic apparatus.

It should be noted that the above-mentioned outline of various embodiments does not cover all necessary features of various embodiments, and combinations or subcombinations of these components con also be covered by various embodiments.

As a matter of course, various changes (for example, each hardware component of the electronic apparatus used in various embodiments is combined with a plurality of machines, and functions of the component are implemented while being distributed to the machines) can be easily conceived by those skilled in the art. Such changes are concepts that are naturally included in the idea of various embodiments. Note that these components are given as examples, and all the components are not necessarily essential to various embodiments.

Further, various embodiments may be implemented in the form of hardware, software, or a combination of hardware and software. In the case of the combination of hardware and software, execution in an electronic apparatus in which the program for an electronic apparatus is installed is a typical example of the implementation. In this case, the program for an electronic apparatus is loaded and executed on a memory of the electronic apparatus, to thereby control the electronic apparatus to execute processing according to various embodiments. The program for an electronic apparatus may be configured using a group of commands that can be expressed by on arbitrary language, code, or notation. Such a group of commands enables the computer to execute processing according to various embodiments, after performing a particular function directly or through any one or both of 1. conversion into another language, code, or notation, and 2. copying to another medium.

According to various embodiments, an expression that can be a dangerous expression based on a particular theme can be detected. Further, according to various embodiments, an expression that can be a dangerous expression based on a particular theme and a particular period can be detected. Enabling such detection enables, for example, a management server that manages an SNS to provide a service that informs a user in advance that contents to be posted by the user include an expression that can be a dangerous expression. Further, enabling such detection enables, for example, a user terminal of the user who uses the SNS to provide a service that informs the user that the contents to be posted include an expression that can be a dangerous expression, before the posting. Furthermore, enabling such detection enables providing a tool for trend analysis of an expression that can be a dangerous expression.

Various embodiments are described below with reference to the drawings. Throughout the drawings, the same reference signs denote the same components unless otherwise defined. It should be noted that various embodiments is given to describe the various embodiments, and is not intended to limit the scope of various embodiments.

A first electronic apparatus usable in various embodiments is not particularly limited as long as the first electronic apparatus is an electronic apparatus capable of carrying out processing of a dangerous expression learning phase and arbitrarily carrying out processing of a dangerous expression detecting phase. The first electronic apparatus may be, for example, a computer (for example, a server computer, a desktop computer, a notebook computer, or an integrated personal computer), or may be, for example, a tablet terminal (for example, on Android® terminal, a Windows® tablet, or an iOS terminal), a smartphone, a mobile phone, a personal digital assistant (PDA), a medical equipment terminal, a game terminal, a car navigation system, a portable navigation system, or a kiosk terminal.

A second electronic apparatus usable in various embodiments is not particularly limited as long as the second electronic apparatus is an electronic apparatus capable of carrying out the processing of the dangerous expression detecting phase. Similarly to the first electronic apparatus, the second electronic apparatus may be, for example, a computer (for example, a server computer, a desktop computer, a notebook computer, or an integrated personal computer), or may be, for example, a tablet terminal (for example, on Android® terminal, a Windows® tablet, or an iOS terminal), a smartphone, a mobile phone, a personal digital assistant (PDA), a medical equipment terminal, a game terminal, a car navigation system, a portable navigation system, or a kiosk terminal.

Figure 1A:
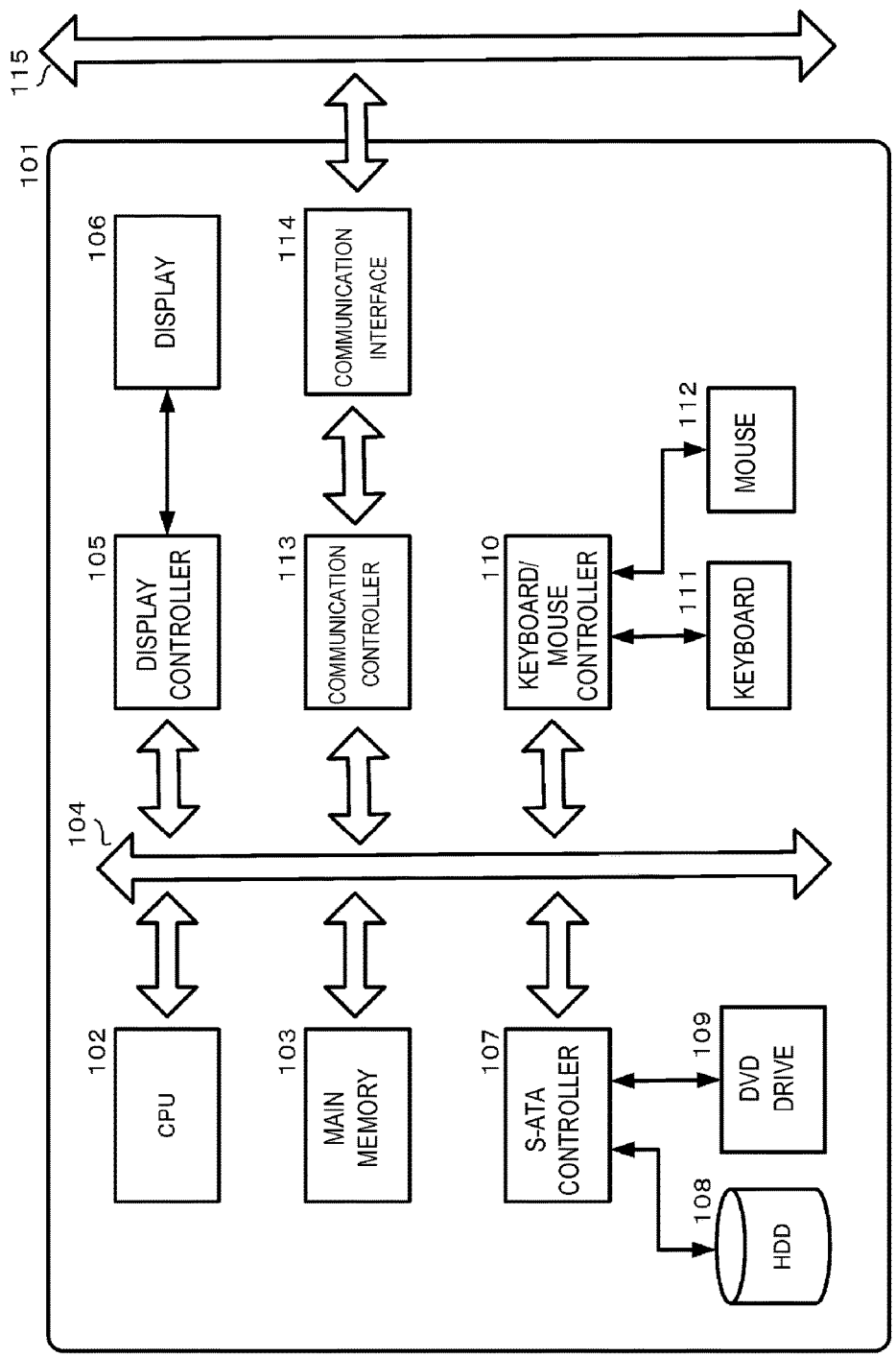
Figure 1B:
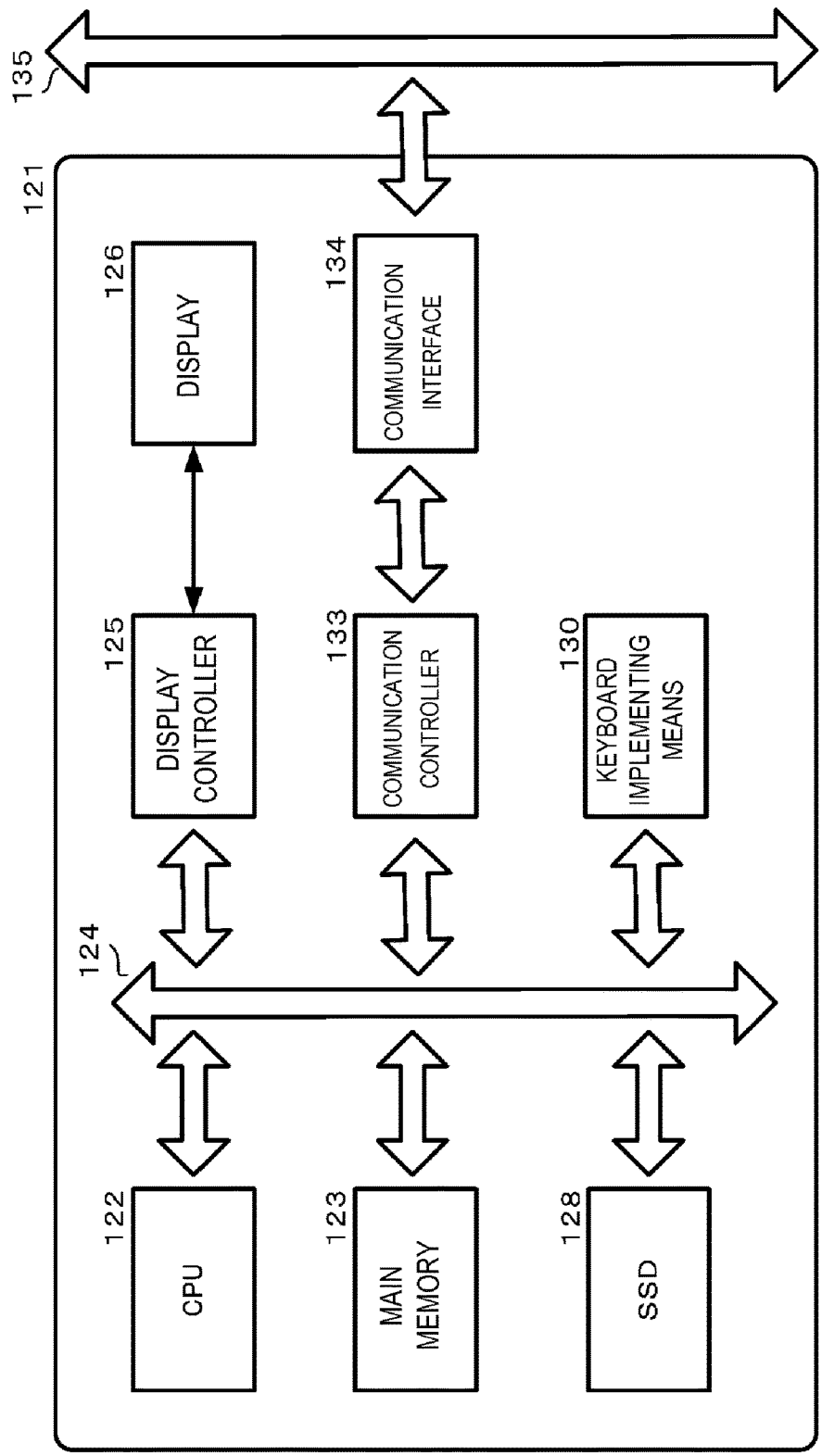

FIG. 1A and FIG. 1B are diagrams each illustrating an example of a hardware configuration for implementing an electronic apparatus (the first electronic apparatus or the second electronic apparatus) usable in various embodiments.

FIG. 1A is a diagram illustrating an example of a computer (for example, a desktop computer, a notebook computer, or an integrated personal computer) as the electronic apparatus usable in various embodiments.

An electronic apparatus (101) includes a CPU (102) and a main memory (103), which are connected to a bus (104). The CPU (102) may be based on a 32-bit or 64-bit architecture. Examples of the CPU (102) may include Core® i series, Core® 2 series, Atom® series, Xeon® series, Pentium® series, and Celeron® series of Intel Corporation, A series, Phenom® series, Athlon® series, Turion® series, and Sempron® of Advanced Micro Devices (AMD), Inc., and Power® series of International Business Machines Corporation.

A display (106), for example, a liquid crystal display (LCD) is connected to the bus (104) via a display controller (105). Further, the liquid crystal display (LCD) may be, for example, a touch panel display or a floating touch display. The display (106) can be used to display, on appropriate graphic interface, an object presented by an operation of software running on the electronic apparatus (101) (for example, a program for an electronic apparatus according to various embodiments or various programs for an electronic apparatus running on the electronic apparatus (101)).

A disk (108) (for example, a hard disk drive or a solid state drive (SSD)) can be arbitrarily connected to the bus (104) via, for example, a SATA or IDE controller (107). A drive (109) (for example, a CD, DVD, or BD drive) can be arbitrarily connected to the bus (104) via, for example, the SATA or IDE controller (107). A keyboard (111) and a mouse (112) can be arbitrarily connected to the bus (104) via a peripheral device controller (110) (for example, a keyboard/mouse controller) or via a USB bus.

An operating system such as Windows®, UNIX®, or Mac OS®, programs which provide Java® processing environment such as J2EE, Java® application, Java® virtual machine (VM), and Java® just-in-time (JIT) compliers, computer programs according to various embodiments, and other programs, and data can be stored in the disk (108), from which they can be loaded on the main memory (103).

The disk (108) may be built in the electronic apparatus (101), may be connected to the electronic apparatus (101) via a cable such that the electronic apparatus (101) con access the disk (108), or may be connected to the electronic apparatus (101) via a wired or wireless network such that the electronic apparatus (101) con access the disk (108). The drive (109) can be used to install a program (for example, an operating system, on application, or the program for an electronic apparatus according to various embodiments) onto the disk (108) from a CD-ROM, a DVD-ROM, or a BD as needed.

A communication interface (114) is compliant with, for example, an Ethernet® protocol. The communication interface (114) is connected to the bus (104) via a communication controller (113). The communication interface (114) plays a role in establishing wired or wireless connection of the electronic apparatus (101) to a communication line (115), and provides a network interface layer to a TCP/IP communication protocol of a communication function of an operating system of the electronic apparatus (101). Note that the communication line may be, for example, wireless LAN environments based on wireless LAN connection standards, Wi-Fi LAN environments such as IEEE802.11a/b/g/n, or mobile phone network environments (for example, 3G or 4G environments).

FIG. 1B is a diagram illustrating an example of a tablet terminal, a smartphone, a mobile phone, a personal digital assistant (PDA), a medical equipment terminal, a game terminal, a car navigation system, a portable navigation system, or a kiosk terminal, as the electronic apparatus usable in various embodiments.

A CPU (122), a main memory (123), a bus (124), a display controller (125), a display (126), a SSD (128), a communication controller (133), a communication interface (134), and a communication line (135) in an electronic apparatus (121) illustrated in FIG. 1B respectively correspond to the CPU (102), the main memory (103), the bus (104), the display controller (105), the display (106), the disk (108), the communication controller (113), the communication interface (114), and the communication line (115) in the electronic apparatus (101) illustrated in FIG. 1A.

In the case of the tablet terminal or the like, the CPU (122) may be, for example, a CPU for the smartphone, the mobile phone, or the tablet terminal, or A series of Apple Inc. For example, an operating system for the smartphone (for example, Android® OS, Windows® phone OS, Windows® OS, or iOS), application programs according to various embodiments, other programs, and data can be stored in the SSD (128) disk, from which they can be loaded on the main memory (123). Keyboard implementing means (130) displays a software keyboard as one of applications on the display (126).

Figure 2A:
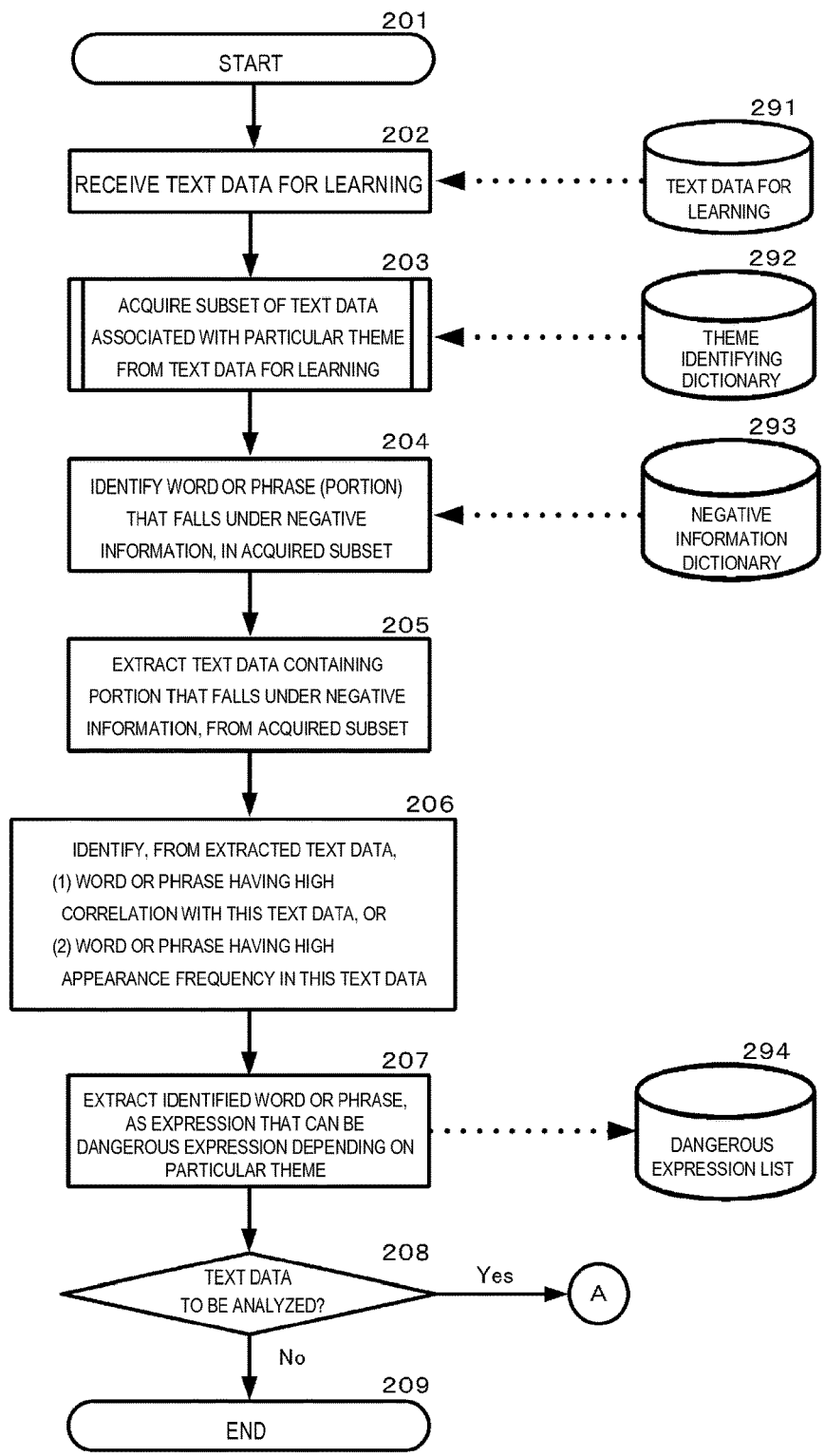
FIG. 2A is a flow chart illustrating a processing flow of a dangerous expression learning phase in which an expression that can be a dangerous expression based on a particular theme is extracted using text data for learning, and a dangerous expression list is created, according to the embodiment.

FIG. 2A is a flow chart illustrating a processing flow of the dangerous expression learning phase in which an expression that can be a dangerous expression based on a particular theme is extracted using text data for learning, and a dangerous expression list is created, according to various embodiments. The electronic apparatus in the following description of FIG. 2A and FIG. 2B refers to the first electronic apparatus for carrying out the processing of the dangerous expression learning phase. In Block 201, the electronic apparatus starts the processing of the dangerous expression learning phase. In Block 202, the electronic apparatus receives text data for learning (291) in order to extract the expression that can be the dangerous expression based on the particular theme. The electronic apparatus may receive the text data for learning via, for example, a server computer or a recording medium (for example, a CD, a DVD, a USB memory, or a hard disk). The text data for learning is a set of text data from which malicious slanders are to be extracted, and may be a set of data on a blog or bulletin board. The text data for learning may be a set of tweets on Twitter® or a set of messages on FACEBOOK® or LINE®. In Block 203, the electronic apparatus acquires a subset of text data associated with the particular theme, from the text data for learning received in Block 202. The electronic apparatus can identify the text data associated with the particular theme using, for example, a theme identifying dictionary (292), to thereby acquire the subset of text data.

The text data associated with the particular theme may be text data having a context associated with the particular theme. Examples of the particular theme include: an earthquake disaster, reconstruction, power saving, an earthquake, and seismic sea waves (tsunami); a product name or service name of a particular corporation; and terms concerning confidential information, but the particular theme is not limited thereto. For example, the term "earthquake" and the term "reconstruction" can be used to identify the context of the particular theme "earthquake". The theme identifying dictionary (292) includes words or phrases used for the particular theme.

The details of Block 203, that is, the details of a process for acquiring the subset of text data associated with the particular theme are described in the following description of FIG. 2B. In Block 204, in order to narrow down the subset of text data to text data containing negative information (text data having a context of the negative information) using superficial (character appearance-based) negative information, the electronic apparatus first identifies a word or phrase that falls under the negative information, in the subset of text data (that is, the text data associated with the particular theme) acquired in Block 203. The electronic apparatus can identify a word or phrase that falls under the negative information using, for example, a negative information dictionary (293).

Examples of the negative information include words and phrases that fall under malicious slanders (for example, fake, problem, should stop doing, should resign, prevent, sad, ugly, stupid, incompetent, liar, sad, unforgivable, bad, horrible, hypocrite, ostracism, and backroom influence), restricted words and phrases (for example, restricted words and phrases designated by a government or a corporation), words and phrases that fall under rumor information (for example, product defect and decrease in service), words and phrases that fall under divulging of information (for example, divulging of information, leakage of information, confidential information, company secret, department secret, and patent prior to the filing of the patent application), and such words and phrases that evoke a sign of foul play (for example, suicide and murder), regardless of contexts. The negative information dictionary (293) includes words or phrases that fall under the above-mentioned negative information. A specific example of Block 204, that is, an example of identifying a word or phrase that falls under the negative information is illustrated in FIG. 5 to be described later.

In Block 205, in order to narrow down the subset of text data to the text data containing the negative information (the text data having the context of the negative information) using the superficial (character appearance-based) negative information, the electronic apparatus then extracts text data containing the word or phrase identified in Block 204, from the subset acquired in Block 203. A specific example of Block 205, that is, an example of extracting the text data containing the negative information is illustrated in FIG. 5 to be described later.

In Block 206, the electronic apparatus identifies the following word or phrase from the text data extracted in Block 205 (that is, the text data that is associated with the particular theme and contains the negative information): (1) a word or phrase having a high correlation with the text data extracted in Block 205; or (2) a word or phrase having a high appearance frequency in the text data extracted in Block 205.

On arbitrary method known by those skilled in the art can be used as a method for identifying a word or phrase having a high correlation with the text data. Such a word or phrase having a high correlation with the text data can be identified according to, for example, the following method. It is assumed that: the number of documents of the entire text data is D; the number of documents of a subset of the text data is A; the number of documents including a given word or phrase w is B; and the number of documents including w among the documents of the subset of text data is C. In this case, if CD/AB is larger than 1, w is identified as the word or phrase having a high correlation with the text data.

In identifying the word or phrase from the text data, the electronic apparatus can identify a co-occurrence expression of at least two words as an expression that can be a dangerous expression. Co-occurrence of words or phrases having a high correlation with the text data can be identified according to, for example, the following method. It is assumed that: the number of documents of the entire text data is D; the number of documents of a subset of the text data is A; the number of documents including both given words or phrases w1 and w2 is B; and the number of documents including both w1 and w2 among the documents of the subset of text data is C. In this case, if CD/AB is larger than 1, co-occurrence (w1, w2) is identified as the co-occurrence of the words or phrases having a high correlation with the text data.

In Block 207, the electronic apparatus extracts the word or phrase identified in Block 206, as the expression that can be the dangerous expression based on the particular theme used in Block 203. Further, the electronic apparatus can extract the particular theme used in Block 203 together with the expression that can be the dangerous expression. The expression that can be the dangerous expression based on the particular theme is the one which may not be negative information (for example, the words and phrases that fall under the malicious slanders) in terms of the entire text, but becomes a dangerous expression if it is considered in connection with a particular theme.

The electronic apparatus can store, into a dangerous expression list (294), the extracted expression that can be the dangerous expression, in association with the particular theme. Accordingly, the dangerous expression list (294) includes data in which a particular theme and at least one expression that can be a dangerous expression associated with the particular theme are paired. The dangerous expression list (294) is used in the processing of the dangerous expression detecting phase illustrated in FIG. 6 to be described later (see Block 607 in FIG. 6).

In Block 208 that is on arbitrary block, in order to determine whether or not to move on to the processing of the dangerous expression detecting phase, the electronic apparatus determines whether or not text data to be analyzed exists. If the text data to be analyzed exists, the electronic apparatus advances the processing to Block 602 in FIG. 6. Meanwhile, if no text data to be analyzed exists, the electronic apparatus advances the processing to Block 209. In Block 209, the electronic apparatus ends the processing of the dangerous expression learning phase.

Figure 2B:
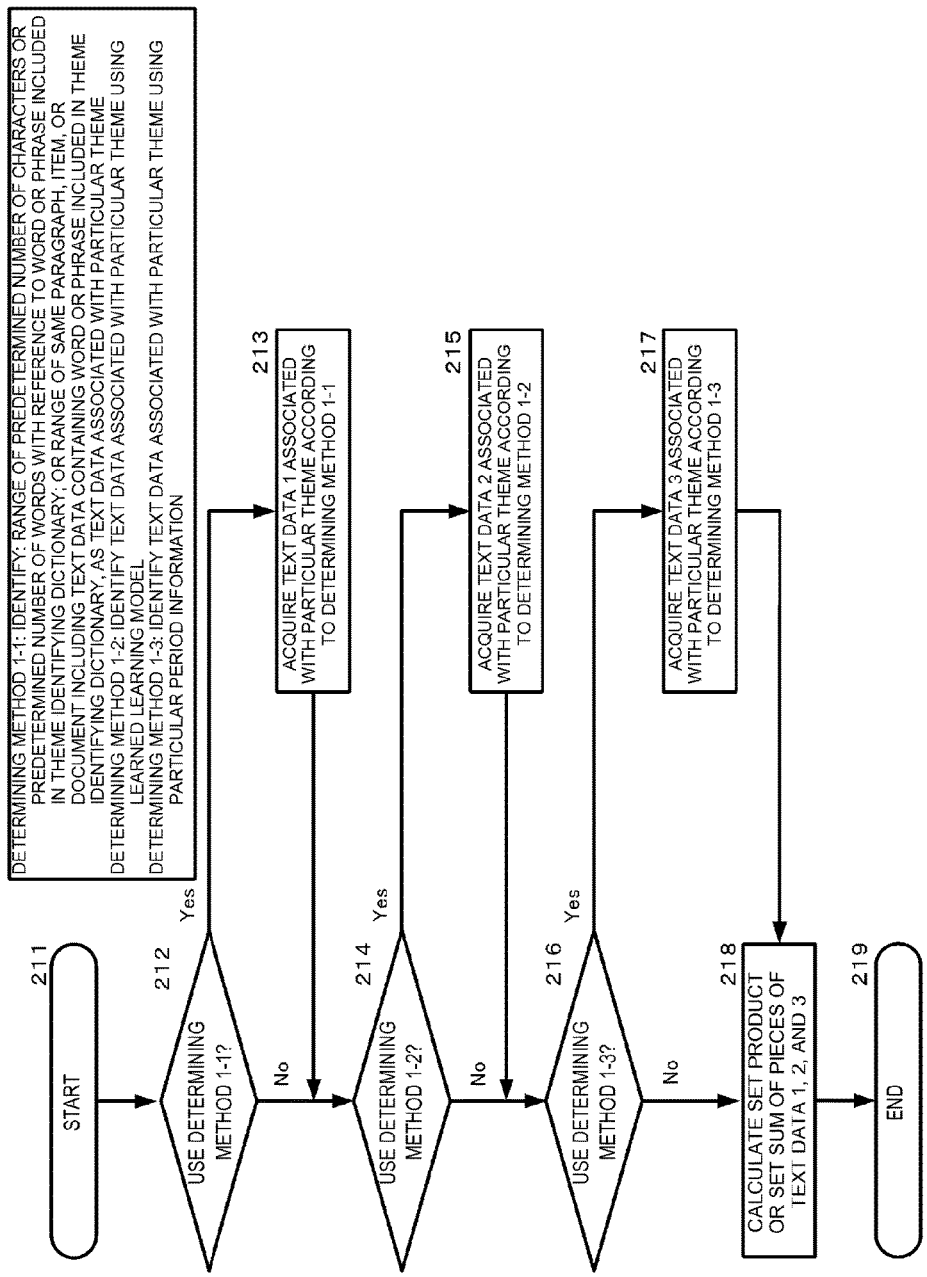
FIG. 2B is a flow chart illustrating a processing flow for acquiring a subset of text data associated with the particular theme from the text data for learning, in the processing flow of the dangerous expression learning phase according to the embodiment.

FIG. 2B is a flow chart illustrating the details of the process (the process for acquiring the subset of text data associated with the particular theme from the text data for learning) in Block 203 in the processing flow of the dangerous expression learning phase illustrated in FIG. 2A. In Block 211, the electronic apparatus starts the process for acquiring the subset of text data associated with the particular theme from the text data for learning. In Block 212, the electronic apparatus determines whether or not to acquire the subset of text data according to the following determining method 1-1. The determining method 1-1 is as follows: (1) identify a range of a predetermined number of characters or a predetermined number of words before and after a word or phrase that exists in the text data for learning (291) and is included in the theme identifying dictionary (292), as text data 1 associated with the particular theme; or (2) identify the same sentence, paragraph, item, or document including text data containing a word or phrase included in the theme identifying dictionary (292), as the text data 1 associated with the particular theme.

If the subset of text data is acquired according to the determining method 1-1, the electronic apparatus advances the processing to Block 213. Meanwhile, if the subset of text data is not acquired according to the determining method 1-1, the electronic apparatus advances the processing to Block 214. In Block 213, the electronic apparatus acquires the text data 1 associated with the particular theme from the text data for learning, according to the determining method 1-1.

According to the former of the determining method 1-1, a range of a predetermined number of characters or a predetermined number of words before and after a word or phrase that appears in the text data for learning (291) and is included in the theme identifying dictionary (292) is identified as the text data associated with the particular theme. Accordingly, the identified text data may not be a complete sentence sectioned by punctuation marks in some cases. The identified text data is also a context relating to the particular theme. For example, it is assumed that the term "reconstruction" that is included in the theme identifying dictionary (292) and exists in the text data for learning (291) is used to identify text data associated with the particular theme "earthquake". For example, in the case where the text data is written in Japanese, the electronic apparatus can identify a range of a predetermined number of characters or a predetermined number of words before and after the term "Fukko" (Japanese; "reconstruction" in English), which may be a range of, for example, 60 characters before and after the term "Fukko" (Japanese) or a range of, for example, 20 words before and after the term "Fukko" (Japanese), as the text data 1 associated with the particular theme "earthquake". Further, for example, in the case where the text data is written in English, the electronic apparatus can identify a range of, for example, 120 characters before and after the term "reconstruction" (English) or a range of, for example, 20 words before and after the term "reconstruction" (English), as the text data 1 associated with the particular theme "earthquake".

According to the latter of the determining method 1-1, the same sentence, paragraph, item, or document including text data containing a word or phrase included in the theme identifying dictionary (292) is identified as the text data associated with the particular theme. The identified text data is also a context relating to the particular theme. Examples of the document include one message on Twitter®, FACEBOOK®, or LINE®, one message transmitted by an e-mail program, and one comment on an electronic bulletin board. For example, it is assumed that the term "earthquake" that is included in the theme identifying dictionary (292) and exists in the text data for learning (291) is used to identify text data associated with the particular theme "earthquake". The electronic apparatus identifies the same sentence, paragraph, item, or document including text data containing the term "earthquake", as the text data 1 associated with the particular theme "earthquake".

In Block 214, the electronic apparatus determines whether or not to acquire the subset of text data according to the following determining method 1-2. The determining method 1-2 is as follows: Identify text data 2 associated with the particular theme using a learned learning model. If the subset of text data is acquired according to the determining method 1-2, the electronic apparatus advances the processing to Block 215. Meanwhile, if the subset of text data is not acquired according to the determining method 1-2, the electronic apparatus advances the processing to Block 216.

In Block 215, the electronic apparatus acquires the text data 2 associated with the particular theme from the text data for learning, according to the determining method 1-2. The learned learning model is generated according to an arbitrary method for machine learning known by those skilled in the art. An example method for generating the learned learning model is described later with reference to FIG. 3. Further, a method for identifying the text data 2 associated with the particular theme using the learned learning model is described later with reference to FIG. 4. In Block 216, the electronic apparatus determines whether or not to acquire the subset of text data according to the following determining method 1-3. The determining method 1-3 is as follows:

identify text data 3 associated with the particular theme using particular time period information, and if the subset of text data is acquired according to the determining method 1-3, the electronic apparatus advances the processing to Block 217. Meanwhile, if the subset of text data is not acquired according to the determining method 1-3, the electronic apparatus advances the processing to Block 218. In Block 217, the electronic apparatus acquires the text data 3 associated with the particular theme from the text data for learning, using the determining method 1-3.

The particular time period information may be information that enables on association between a period and a context of a particular theme. The particular time period information is, for example, on and after Mar. 11, 2011 (Great East Japan Earthquake that occurred in Japan). The particular time period information "Mar. 11, 2011", which is associated with the particular theme "earthquake", can be used to identify the text data associated with the particular theme "earthquake".

In Block 218, the electronic apparatus performs a set operation on the pieces of text data 1, 2, and 3 respectively acquired in Block 213, Block 215, and Block 217. The set operation includes, for example, intersection and union. The electronic apparatus performs the set operation to thereby acquire the subset of text data associated with the particular theme. Note that, in the case where the acquired text data is any one of the pieces of text data 1, 2, and 3, the electronic apparatus regards the one piece of text data as the subset of text data associated with the particular theme. In Block 219, the electronic apparatus ends the process for acquiring the subset of text data associated with the particular theme from the text data for learning.

FIG. 3 illustrates a model diagram for creating the learned learning model used to identify the text data associated with the particular theme from the text data for learning, in the processing of the dangerous expression learning phase according to various embodiments. The learned learning model can be created by the first electronic apparatus or an electronic apparatus other than the first electronic apparatus. The electronic apparatus in the following description of FIG. 3 refers to the first electronic apparatus or an electronic apparatus other than the first electronic apparatus. In Block A, the electronic apparatus receives original data to be inputted to a learning machine, that is, a group (301) of original data of "text data with a label for context learning". The electronic apparatus may receive the group (301) of original data via, for example, a server computer or a recording medium (for example, a CD, a DVD, a USB memory, or a hard disk). In the example illustrated in FIG. 3, the group (301) of original data contains pieces of original data (311) to (315), but it should be noted that various embodiments is not limited thereto.

The group (301) of original data is a document data set prepared separately from the text data for learning illustrated in Block 202 of FIG. 2A. The group (301) of original data may be a set of tweets on Twitter® or a set of messages on FACEBOOK® or LINE®. As illustrated in FIG. 3, 0 (311) or at least one (312 to 315) tag is given to each of the pieces of original data (311) to (315). The tag indicates, for example, whether or not the original data is text data that falls under "earthquake". The tag may be given to the original data automatically by the electronic apparatus or manually by a user as needed.

In Block B, the electronic apparatus creates a group (321) of text data with a label for context learning, in order to create a learning model from each of the received pieces of original data (311) to (315). In the example illustrated in FIG. 3, the group (321) of text data with a label for context learning contains pieces of text data with a label for context learning (331) to (335), but it should be noted that various embodiments is not limited thereto.

Each of the pieces of text data with a label for context learning (331) to (335) contains information (bag-of-words) of each word and the number of times of appearance thereof in each of the pieces of original data (311) to (315). Further, for example, in the case where the original data is text data that falls under the particular theme "earthquake", that is, in the case where the original data has a tag of "Great East Japan Earthquake", "earthquake", or "reconstruction assistance", the electronic apparatus gives a label of "earthquake" to text data with a label for context learning corresponding to the original data. Accordingly, in the example illustrated in FIG. 3, the electronic apparatus gives the label of "earthquake" to the pieces of text data with a label for context learning (332), (334), and (335), of the pieces of text data with a label for context learning (331) to (335). The electronic apparatus inputs the information (bag-of-words) of each word and the number of times of appearance thereof in each of the pieces of original data (311) to (315), and a label (yes/no) indicating whether or not each of the pieces of text data with a label for context learning (331) to (335) is text data that falls under "earthquake", to the learning machine (for example, a logistic regression model). That is, the electronic apparatus vectorizes the pieces of text data with a label for context learning (331) to (335) using the bag-of-words, and inputs the obtained vectors as dependent variables, and the labels (yes/no) indicating whether or not the pieces of text data with a label for context learning (331) to (335) fall under the particular theme "earthquake" as objective variables, to the learning machine (for example, a logistic regression model), whereby the learning machine is caused to learn. In the electronic apparatus, on arbitrary learning machine known by those skilled in the art can be used for the learning machine. The electronic apparatus creates the learned learning model on the basis of the above-mentioned inputs to the learning machine.

Although the logistic regression model is described in the above, various other methods (such as a k-nearest neighbor algorithm, a simple Bayesian method, a decision list method, a maximum entropy method, a support vector machine method, a neural network method, and a multiple regression analysis method) can be used. These methods are all known by those skilled in the art, and hence description thereof is omitted herein.

Figure 4:
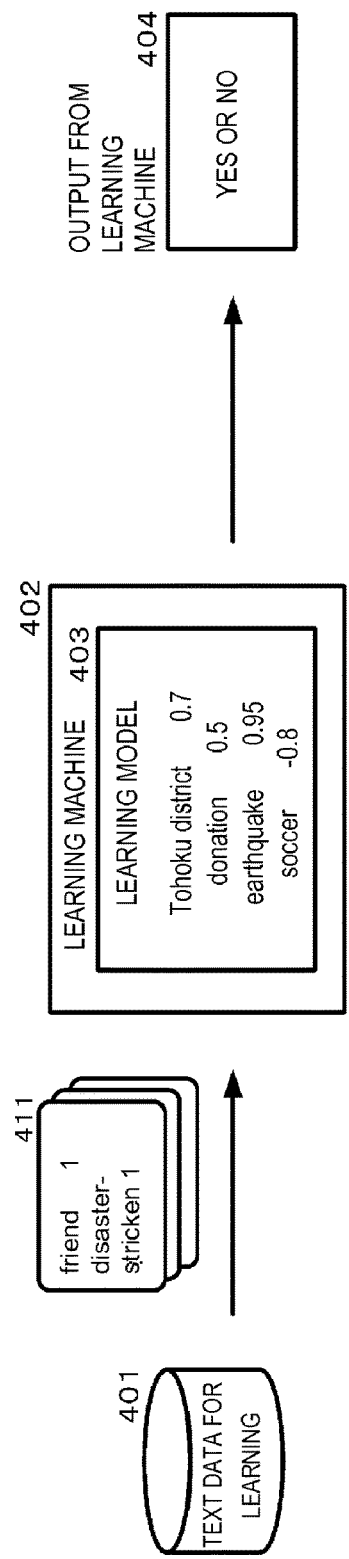
FIG. 4 illustrates a model diagram for identifying the text data associated with the particular theme from the text data for learning, using the learned learning model, in the processing of the dangerous expression learning phase according to the embodiment.

FIG. 4 illustrates a model diagram for identifying the text data associated with the particular theme from the text data for learning, using the learned learning model, in the processing of the dangerous expression learning phase according to various embodiments. The electronic apparatus in the following description of FIG. 4 refers to the first electronic apparatus. The electronic apparatus determines whether or not text data for learning (401) is the text data associated with the particular theme, using a learned learning model (403) created as illustrated in FIG. 3.

The electronic apparatus vectorizes the text data for learning (401) using a bag-of-words according to a method similar to that illustrated in FIG. 3. Then, the electronic apparatus inputs, for each piece of text data, the text data for learning (401) in a bag-of-words form (411) to a learned learning machine (402). The learning machine (402) returns an output as to whether or not each piece of text data is the text data associated with the particular theme (Yes=the text data is the text data associated with the particular theme; No=the text data is not the text data associated with the particular theme), to the electronic apparatus. The electronic apparatus acquires the output (Yes, No) from the learning machine (402), and acquires a set of text data for which the output is yes, as a subset associated with the particular theme.

FIG. 5 illustrates a model diagram for identifying a word or phrase that falls under negative information (Block 204), extracting text data containing the negative information (Block 205), and extracting an expression that can be a dangerous expression based on a particular theme, from the extracted data (Blocks 206, 207), in the processing of the dangerous expression learning phase according to various embodiments. The electronic apparatus in the following description of FIG. 5 refers to the first electronic apparatus.

A group (501) of text data illustrated in FIG. 5 is part of the subset of text data (that is, the text data associated with the particular theme "earthquake") acquired in Block 203 illustrated in FIG. 2. The group (501) of text data includes pieces of text data (511) to (515). The electronic apparatus identifies a word or phrase that falls under the negative information, in the group (501) of text data, using the negative information dictionary (293) (see Block 204). The pieces of negative information in the pieces of text data (511) to (515) are respectively "problem", "prevent", "should stop doing", "fake", and "sad" (portions identified by single underlines). The electronic apparatus extracts the pieces of text data (511) to (515) respectively containing the pieces of negative information "problem", "prevent", "should stop doing", "fake", and "sad" (Block 205). Although not illustrated in FIG. 5, text data containing no negative information is not extracted.

Subsequently, the electronic apparatus identifies words having a high appearance frequency in the extracted pieces of text data (511) to (515). The electronic apparatus identifies a co-occurrence expression of "buy" and "battery" as the words having a high appearance frequency (Block 206). Then, the electronic apparatus extracts the identified words "buy" and "battery" as an expression that can be a dangerous expression based on the particular theme "earthquake". Further, the electronic apparatus extracts the particular theme "earthquake". The electronic apparatus stores, into the dangerous expression list (294), the extracted expression "buy" and "battery" that can be the dangerous expression, in connection with the particular theme "earthquake".

In the method described above, the electronic apparatus identifies a word or phrase that falls under the negative information, in the group (501) of text data, using the negative information dictionary (293), and extracts text data containing the word or phrase that falls under the negative information. Alternatively, the electronic apparatus may extract the text data containing the word or phrase that falls under the negative information, from the group (501) of text data, using the learned learning model. Description is given below of the method for extracting the text data containing the word or phrase that falls under the negative information, from the group of text data, using the learned learning model.

Similarly to Block 215 of FIG. 2B, the learned learning model is generated using on arbitrary method for machine learning known by those skilled in the art. The learned learning model can be created by the first electronic apparatus or an electronic apparatus other than the first electronic apparatus. The electronic apparatus in the following description of the method for generating the learned learning model refers to the first electronic apparatus or an electronic apparatus other than the first electronic apparatus. In Block A, the electronic apparatus receives original data to be inputted to the learning machine, that is, a group of original data of "text data with a label for negative information learning". The electronic apparatus may receive the group of original data via, for example, a server computer or a recording medium (for example, a CD, a DVD, a USB memory, or a hard disk).

The group of original data is a document data set prepared separately from the text data for learning illustrated in Block 202 of FIG. 2A. The group of original data may be a set of tweets on Twitter® or a set of messages on FACEBOOK® or LINE®. A label is given in advance to each piece of the original data. The label indicates whether or not the original data contains the negative information. Alternatively, the label may indicate whether or not the original data contains a word or phrase that falls under known negative information.

In Block B, the electronic apparatus creates a group of text data with a label for negative information learning, in order to create a learning model from each of the received pieces of original data. Each of the pieces of text data with a label for negative information learning contains information (bag-of-words) of each word and the number of times of appearance thereof in each of the pieces of original data.

The electronic apparatus inputs the information (bag-of-words) of each word and the number of times of appearance thereof in each of the pieces of original data, and a label (yes/no) indicating whether or not each of the pieces of text data with a label for negative information learning contains the negative information, to the learning machine (for example, a logistic regression model). That is, the electronic apparatus vectorizes each of the pieces of text data with a label for negative information learning using the bag-of-words, and inputs the obtained vectors as dependent variables, and the labels (yes/no) indicating whether or not each of the pieces of text data with a label for negative information learning contains the negative information as objective variables, to the learning machine (for example, a logistic regression model), whereby the learning machine is caused to learn. In the electronic apparatus, on arbitrary learning machine known by those skilled in the art can be used for the learning machine.

The electronic apparatus creates the learned learning model on the basis of the above-mentioned inputs to the learning machine. Subsequently, the electronic apparatus can extract the text data containing the word or phrase that falls under the negative information, from the group (for example, 501) of text data, using the learned learning model created as described above. The electronic apparatus vectorizes the text data for learning using the bag-of-words. Then, the electronic apparatus inputs, for each piece of text data, the text data for learning in a bag-of-words form to the learned learning machine.

The learning machine returns an output as to whether or not each piece of text data contains the negative information (Yes=the text data contains the negative information; No=the text data does not contain the negative information), to the electronic apparatus. The electronic apparatus acquires the output (Yes, No) from the learning machine, and acquires a set of text data for which the output is yes, as the text data containing the word or phrase that falls under the negative information.

Subsequently, the electronic apparatus identifies a word having a high appearance frequency in each of the acquired pieces of text data. Then, the electronic apparatus extracts the identified word as an expression that can be a dangerous expression based on the particular theme "earthquake". Further, the electronic apparatus extracts the particular theme "earthquake". The electronic apparatus stores, into the dangerous expression list (294), the extracted expression "buy" and "battery" that can be the dangerous expression, in association with the particular theme "earthquake".

A group (521) of text data illustrated in FIG. 5 corresponds to the case where the text data (that is, the text data associated with the particular theme "earthquake") acquired in Block 203 illustrated in FIG. 2A is English. Even in the case where the text data is written in English, similarly to Japanese, the electronic apparatus identifies a word or phrase that falls under negative information (Block 204), extracts text data containing the negative information (Block 205), and extracts an expression that can be a dangerous expression based on the particular theme "earthquake", from the extracted data (Blocks 206, 207). Then, the electronic apparatus stores, into the dangerous expression list (294), the extracted expression "buy" and "battery" that can be the dangerous expression, in association with the particular theme "earthquake".

Alternatively, the electronic apparatus extracts text data containing the word or phrase that falls under the negative information, from the group (501) of text data, using the learned learning model, and extracts an expression that can be a dangerous expression based on the particular theme "earthquake", from the extracted data. Then, the electronic apparatus stores, into the dangerous expression list (294), the extracted expression "buy" and "battery" that can be the dangerous expression, in association with the particular theme "earthquake".

Figure 6:
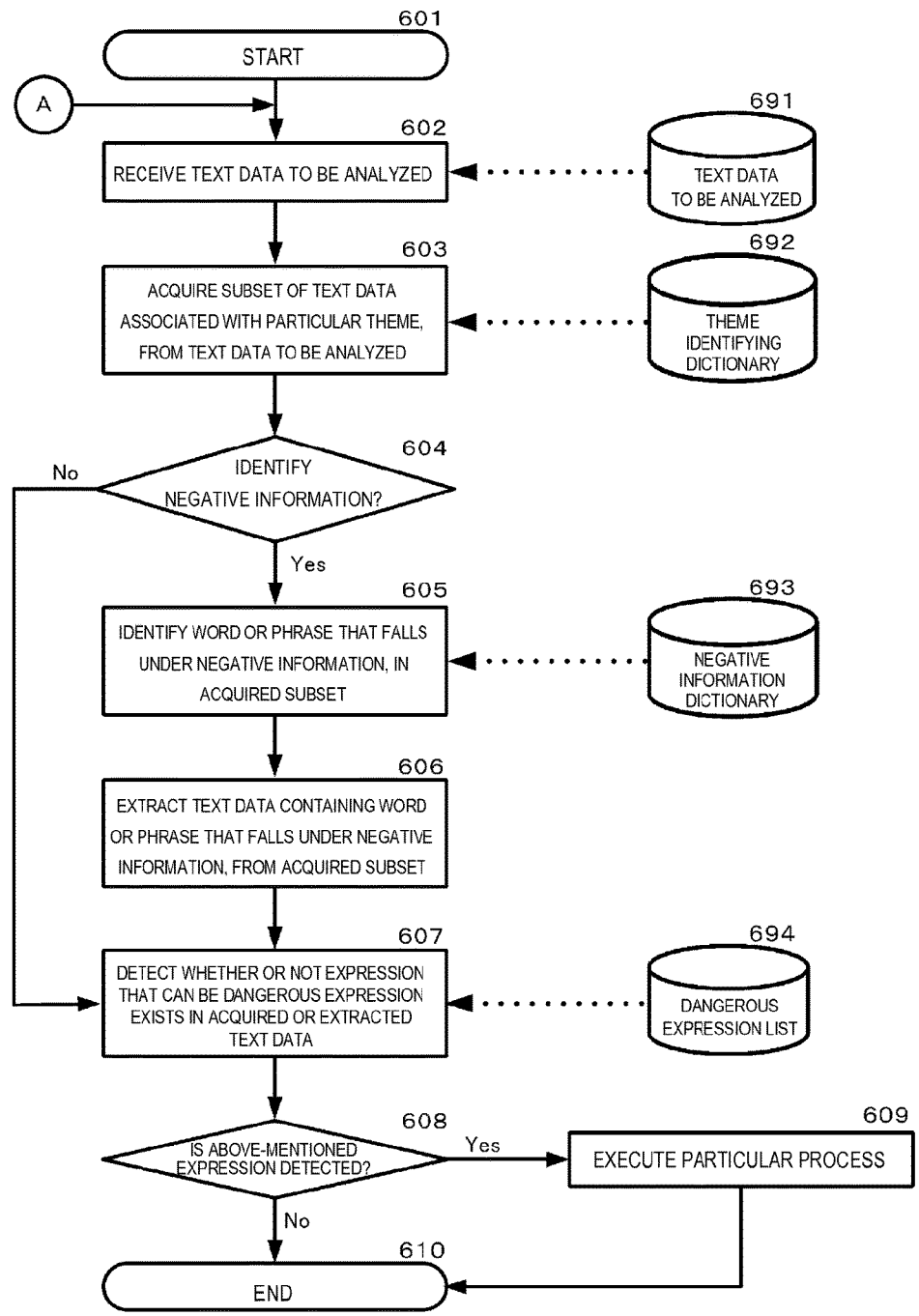
FIG. 6 is a flow chart illustrating a processing flow of a dangerous expression detecting phase in which whether or not an expression that can be a dangerous expression based on a particular theme exists is detected from text data to be analyzed, according to the embodiment.

FIG. 6 is a flow chart illustrating a processing flow of the dangerous expression detecting phase in which whether or not an expression that can be a dangerous expression based on a particular theme exists is detected from text data to be analyzed, according to various embodiments. The electronic apparatus in the following description of FIG. 6 refers to the first electronic apparatus or the second electronic apparatus for carrying out the processing of the dangerous expression detecting phase. In Block 601, the electronic apparatus starts the processing of the dangerous expression detecting phase. In Block 602, the electronic apparatus receives text data to be analyzed (691) in order to detect the expression that can be the dangerous expression based on the particular theme. The electronic apparatus can receive the text data to be analyzed through, for example, an input to the electronic apparatus by a user (for example, a tweet inputted to Twitter® or a message inputted to FACEBOOK® or LINE®) or via, for example, a client computer of the user or a recording medium (for example, a CD, a DVD, a USB memory, or a hard disk). The text data to be analyzed may be a tweet on Twitter® or a message on FACEBOOK® or LINE®.

In Block 603, the electronic apparatus acquires a subset of text data associated with the particular theme, from the text data to be analyzed received in Block 602. The electronic apparatus can identify the text data associated with the particular theme using, for example, a theme identifying dictionary (692), to thereby acquire the subset of text data. The theme identifying dictionary (692) may be the same as the theme identifying dictionary (292) illustrated in FIG. 2A. The details of Block 603, that is, a process for acquiring the subset of text data associated with the particular theme can be performed according to a method similar to the method described above with reference to FIG. 2B.

In Block 604, the electronic apparatus determines whether or not to execute a process for identifying a word or phrase that falls under the negative information, in the subset of text data (that is, the text data associated with the particular theme) acquired in Block 603. In carrying out the processing of the dangerous expression detecting phase, Block 604 may not be executed for the following reason. That is, because the subset of text data associated with the particular theme is acquired in Block 603, if an expression that can be a dangerous expression is detected from the acquired subset, the expression that can be the dangerous expression based on the particular theme can be extracted. If the process for identifying a word or phrase that falls under the negative information is executed, the electronic apparatus advances the processing to Block 605. Meanwhile, if the process for identifying a word or phrase that falls under the negative information is not executed, the electronic apparatus advances the processing to Block 607.

In Block 605, in order to narrow down the subset of text data to text data containing the negative information (text data having a context of the negative information) using superficial (character appearance-based) negative information, the electronic apparatus first identifies a word or phrase that falls under the negative information, in the subset of text data (that is, the text data associated with the particular theme) acquired in Block 603. The electronic apparatus can identify a word or phrase that falls under the negative information using, for example, a negative information dictionary (693). The negative information dictionary (693) may be the same as the negative information dictionary (293) illustrated in FIG. 2A.

In Block 606, in order to narrow down the subset of text data to text data containing the negative information (text data having a context of the negative information) using superficial (character appearance-based) negative information, the electronic apparatus then extracts text data containing the word or phrase identified in Block 605, from the subset acquired in Block 603.

In Block 607, the electronic apparatus detects whether or not an expression that can be a dangerous expression that is included in a dangerous expression list (694) and is associated with the particular theme exists in the subset of text data (that is, the text data associated with the particular theme) acquired in Block 603 or in the text data (that is, the text data that is associated with the particular theme and contains the negative information) extracted in Block 606.

In Block 608, the electronic apparatus determines whether or not it is detected that the expression that can be the dangerous expression included in the dangerous expression list (694) exists. If it is detected that the expression that can be the dangerous expression exists, the electronic apparatus advances the processing to Block 609. Meanwhile, if it is not detected that the expression that can be the dangerous expression exists, the electronic apparatus advances the processing to Block 610. If it is detected that the expression that can be the dangerous expression exists, in Block 609, the electronic apparatus executes a particular process. The particular process may be as follows, but is not limited thereto.

In the case where the first electronic apparatus executes the processing of the dangerous expression detecting phase and where the first electronic apparatus is an electronic apparatus of a user client that provides the text data to be analyzed: stop or suspend transmission or upload of the text data to be analyzed onto a network connected to the first electronic apparatus; display, on the screen, an indication (for example, a warning indication) that the text data to be analyzed contains the expression that can be the dangerous expression; or display, on the screen, an indication of the particular theme and the number of times of appearance of the expression that can be the dangerous expression, based on the fact that the expression that can be the dangerous expression exists.

In the case where the first electronic apparatus executes the processing of the dangerous expression detecting phase and where the first electronic apparatus is a server computer connected to the electronic apparatus of the user client that provides the text data to be analyzed: instruct the electronic apparatus of the user client to stop or suspend transmission or upload of the text data to be analyzed onto the network connected to the first electronic apparatus; instruct the electronic apparatus of the user client to display, on its screen, a message (for example, a warning indication) that the text data to be analyzed contains the expression that can be the dangerous expression; or instruct the electronic apparatus of the user client to display, on its screen, an indication of the particular theme and the number of times of appearance of the expression that can be the dangerous expression, based on the fact that the expression that can be the dangerous expression exists.

In the case where the second electronic apparatus executes the processing of the dangerous expression detecting phase: stop or suspend transmission or upload of the text data to be analyzed onto a network connected to the first electronic apparatus; display, on the screen, an indication (for example, a warning indication) that the text data to be analyzed contains the expression that can be the dangerous expression; or display, on the screen, an indication of the particular theme and the number of times of appearance of the expression that can be the dangerous expression, based on the fact that the expression that can be the dangerous expression exists. In Block 610, the electronic apparatus ends the processing of the dangerous expression detecting phase.

Figure 7:
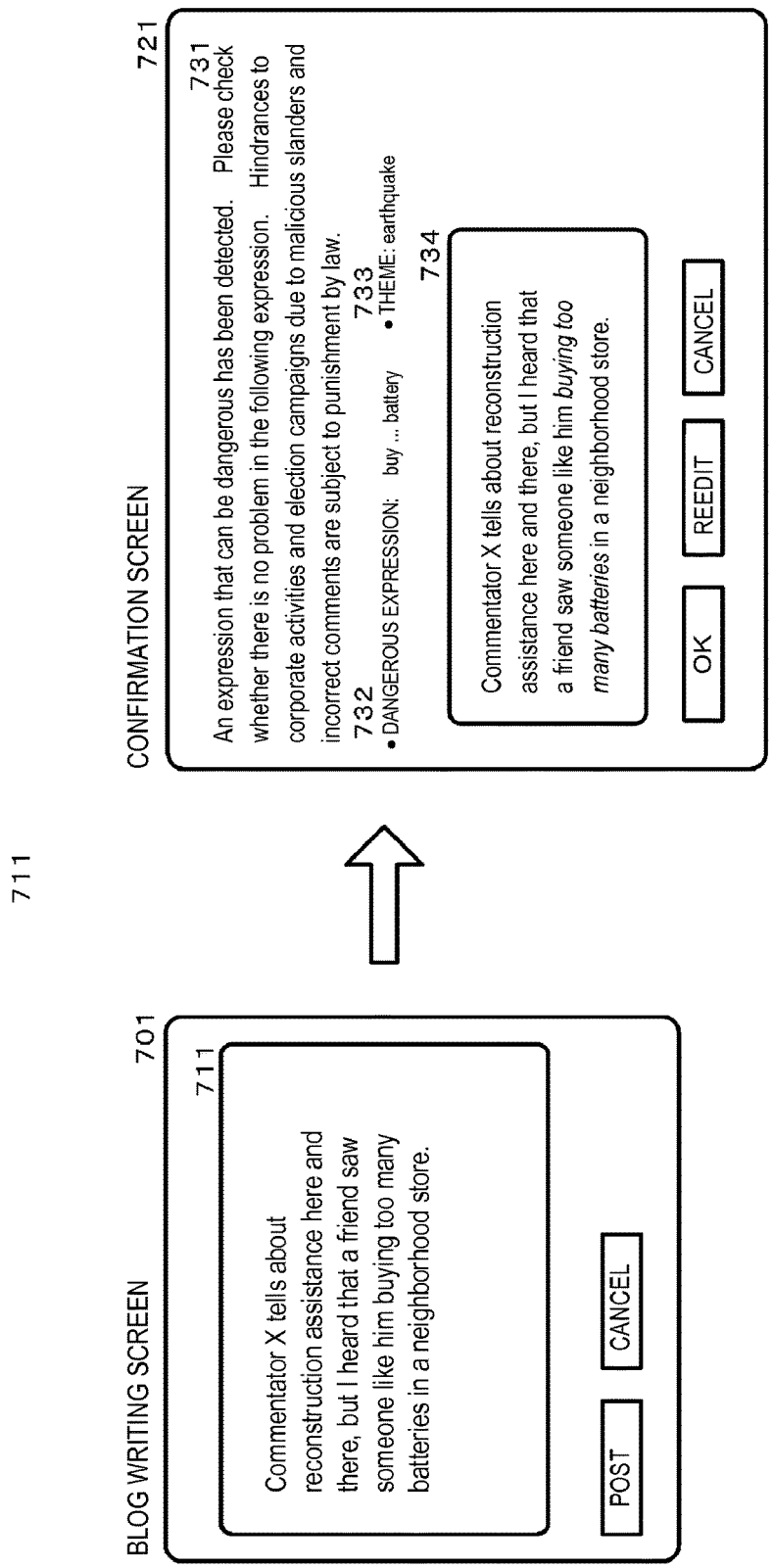
FIG. 7 illustrates an example in which, for example, an SNS management server provides an SNS user with a service that prevents a comment including an expression that can be a dangerous expression (an expression that can be a criticism) based on a particular theme (earthquake), in the processing of the dangerous expression detecting phase according to the embodiment.

FIG. 7 illustrates an example in which, for example, an SNS management server provides an SNS user with a service that prevents a comment including an expression that can be a dangerous expression (an expression that can be a criticism) based on a particular theme (earthquake), in the processing of the dangerous expression detecting phase according to various embodiments. A screen (701) shows a screen on which a user who uses an SNS site tries to input, on a user computer, a blog writing message (711) that is text data and post the inputted blog writing message (711). It is assumed that the user clicks a "POST" button on the screen (701). Based on the click, the user computer transmits the inputted blog writing message (711) to the management server (which falls under the second electronic apparatus) of the SNS site.

It is assumed that the management server of the SNS site receives the blog writing message (711) that is text data to be analyzed, from the user computer. The management server refers to the theme identifying dictionary (692), and determines that the blog writing message (711) is associated with the particular theme "earthquake", on the basis of the fact that the blog writing message (711) includes the term "reconstruction". The management server refers to the dangerous expression list (694), and detects whether or not an expression that can be a dangerous expression associated with the particular theme "earthquake" exists in the blog writing message (711). The management server detects that a co-occurrence expression of "buy" and "battery" that can be a dangerous expression associated with the particular theme "earthquake" exists in the blog writing message (711). Based on the detection of the fact that the co-occurrence expression that can be the dangerous expression associated with the particular theme "earthquake" exists, the management server transmits a command to display, on the user computer, a confirmation screen for confirming with the user whether or not to post the message.

Based on the reception of the command, the user computer displays a confirmation screen (721) on its display apparatus. The confirmation screen (721) includes a warning message (731), an expression that can be a dangerous expression (732), a particular theme (733), and a blog writing message (734). The warning message (731) can be a message for conveying to the user a problem that will be caused by posting the blog writing message (711). The expression that can be the dangerous expression (732) shows an expression that can be a dangerous expression based on the particular theme "earthquake", in the blog writing message (711). The particular theme (733) shows a theme of the blog writing message (711). The blog writing message (734) corresponds to the blog writing message (711) inputted by the user. In the message (734), the expression that can be the dangerous expression (732) is emphatically displayed (for example, italicized, colored, or highlighted).

The user refers to the warning message (731) on the confirmation screen (721), and can select whether to continue the posting ("OK" button), change the contents to be posted ("REEDIT" button), or cancel the posting ("CANCEL" button). In this way, the management server can inform the user that the expression "buy" and "battery" that can be the dangerous expression based on the particular theme "earthquake" exists in the blog writing message (711). Accordingly, the management server can provide the user with a service that prevents a comment that can be a criticism based on the particular theme "earthquake".

Figure 8:
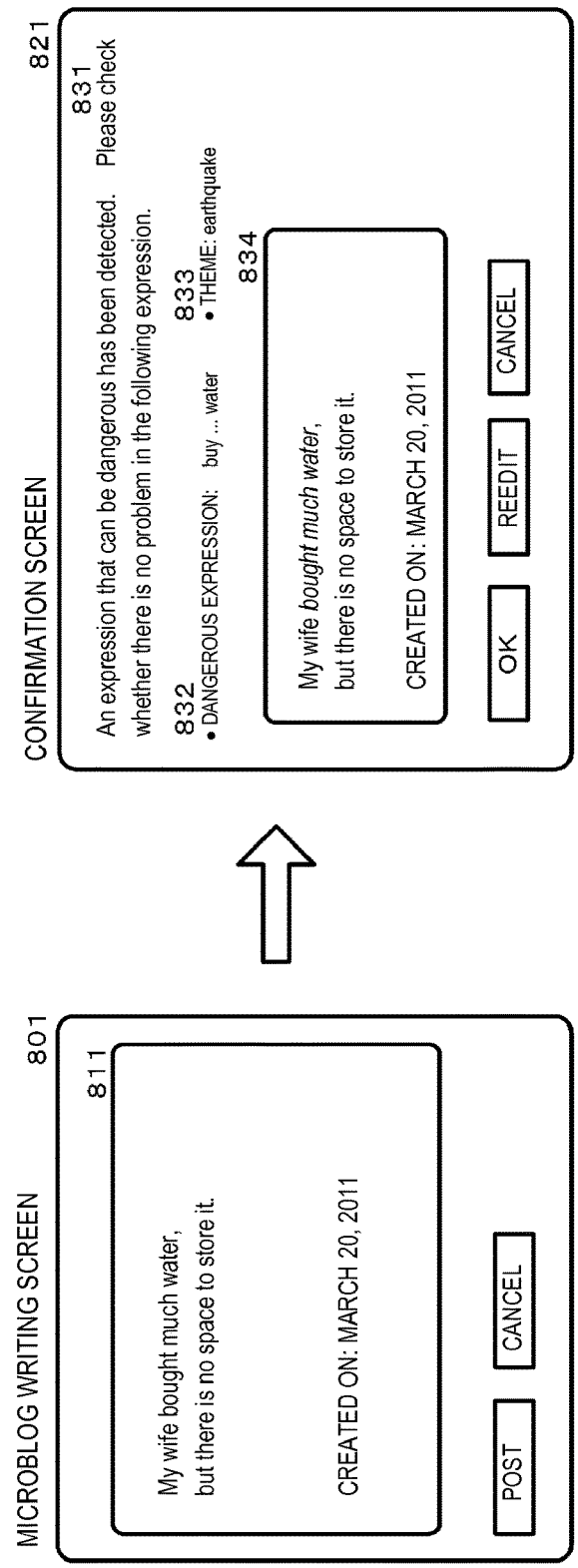
FIG. 8 illustrates an example in which, for example, a sender of information recognizes in advance a comment including an expression that can be a dangerous expression (an expression that can be a criticism) based on a particular theme (earthquake), in the processing of the dangerous expression detecting phase according to the embodiment.

FIG. 8 illustrates an example in which, for example, a sender of information recognizes in advance a comment including an expression that can be a dangerous expression (an expression that can be a criticism) based on a particular theme (earthquake), in the processing of the dangerous expression detecting phase according to various embodiments. A screen (801) shows a screen on which a user tries to input, on a user computer, a microblog writing message (811) that is text data and post the inputted microblog writing message (811). It is assumed that the user clicks a "POST" button on the screen (801). The user computer refers to the particular time period information, and determines that the blog writing message (811) is associated with the particular theme "earthquake", on the basis of the fact that the microblog writing message (811) includes the term "created on: Mar. 20, 2011" or that the term "created on: Mar. 20, 2011" is associated with the microblog writing message (811) (for example, the term "created on: Mar. 20, 2011" is embedded as on attribute value in the microblog writing message (811)). The user computer refers to the dangerous expression list (694), and detects whether or not an expression that can be a dangerous expression associated with the particular theme "earthquake" exists in the microblog writing message (811). The user computer detects that a co-occurrence expression of "buy" and "water" that can be a dangerous expression associated with the particular theme "earthquake" exists in the microblog writing message (811).

Based on the detection of the fact that the co-occurrence expression that can be the dangerous expression associated with the particular theme "earthquake" exists, the user computer displays, on its display apparatus, a confirmation screen (821) for confirming with the user whether or not to post the message. The confirmation screen (821) includes a warning message (831), an expression that can be a dangerous expression (832), a particular theme (833), and a microblog writing message (834). The warning message (831) may be a message for conveying to the user a problem that will be caused by posting the microblog writing message (811). The expression that can be the dangerous expression (832) shows an expression that can be a dangerous expression based on the particular theme "earthquake", in the microblog writing message (811). The particular theme (833) shows a theme of the microblog writing message (811). The blog writing message (834) corresponds to the microblog writing message (811) inputted by the user. In the message (834), the expression that can be the dangerous expression (832) is emphatically displayed (for example, italicized, colored, or highlighted).

The user refers to the warning message (831) on the confirmation screen (821), and can select whether to continue the posting ("OK" button), change the contents to be posted ("REEDIT" button), or cancel the posting ("CANCEL" button). In this way, the user computer can inform the user that the expression "buy" and "water" that can be the dangerous expression based on the particular theme "earthquake" exists in the microblog writing message (811). Accordingly, the user can recognize in advance a comment that can be a criticism based on the particular theme "earthquake".

Figure 9:
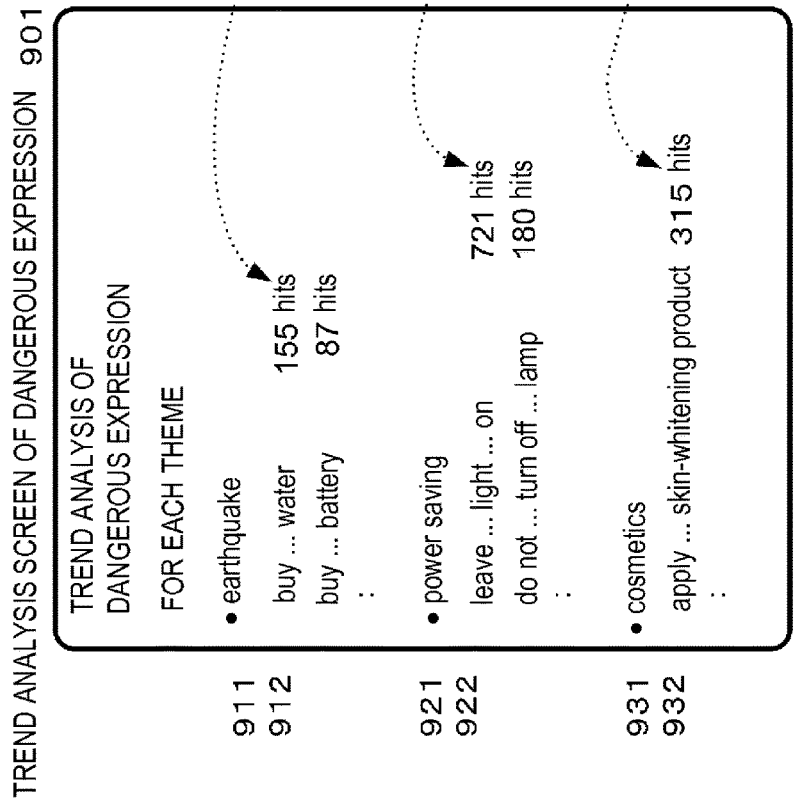
FIG. 9 illustrates an example in which, for example, the SNS management server shows a particular theme, an expression that can be a dangerous expression based on the particular theme, and the number of times of appearance of the expression that can be the dangerous expression, in the processing of the dangerous expression detecting phase according to the embodiment.

FIG. 9 illustrates an example in which, for example, the SNS management server shows a particular theme, an expression that can be a dangerous expression based on the particular theme, and the number of times of appearance of the expression that can be the dangerous expression, in the processing of the dangerous expression detecting phase according to various embodiments. The SNS management server presents, on a screen (901), particular themes (911, 921, 931), expressions that can be dangerous expressions (912, 922, 932) respectively based on the particular themes (911, 921, 931), and, arbitrarily, the respective numbers of times of appearance (913, 923, 933) of the expressions that can be the dangerous expressions (912, 922, 932), which are used as a tool for trend analysis. The SNS manager refers to the screen (901), and reads the particular themes (911, 921, 931), the expressions that can be the dangerous expressions (912, 922, 932), and the numbers of times of appearance (913, 923, 933), whereby the SNS manager can check how many expressions that can be dangerous expressions appear in which context.

FIG. 10 is a diagram illustrating an example of functional blocks of a first electronic apparatus (1001) having the hardware configuration illustrated in FIG. 1, the first electronic apparatus (1001) executing the processing of the dangerous expression learning phase according to various embodiments and arbitrarily executing the processing of the dangerous expression detecting phase according to various embodiments. The first electronic apparatus (1001) includes first subset acquiring means (1011), first text data extracting means (1012), and first dangerous expression extracting means (1013), and arbitrarily includes second subset acquiring means (1021), second text data extracting means (1022), second dangerous expression extracting means (1023), and particular process executing means (1024). In the dangerous expression learning phase, the first subset acquiring means (1011) acquires a subset of text data associated with the particular theme and arbitrarily with the particular time period information, from the text data for learning. The first subset acquiring means (1011) can execute Blocks 202 and 203 illustrated in FIG. 2A and each block illustrated in FIG. 2B. In the dangerous expression learning phase, the first text data extracting means (1012) extracts text data containing the negative information from the subset acquired by the first subset acquiring means (1011). The first text data extracting means (1012) can execute Blocks 204 and 205 illustrated in FIG. 2A. In the dangerous expression learning phase, the first dangerous expression extracting means (1013) extracts, from the text data extracted by the first text data extracting means (1012), (1) a word or phrase having a high correlation with the extracted text data or (2) a word or phrase having a high appearance frequency in the extracted text data, as an expression that can be a dangerous expression based on the particular theme. The first dangerous expression extracting means (1013) can execute Blocks 206 and 207 illustrated in FIG. 2A.

In the dangerous expression detecting phase, the second subset acquiring means (1021) acquires a subset of text data associated with the particular theme from the text data to be analyzed. Note that the first subset acquiring means (1011) may include the function of the second subset acquiring means (1021). The second subset acquiring means (1021) can execute Blocks 602 and 603 illustrated in FIG. 6. In the dangerous expression detecting phase, the second text data extracting means (1022) extracts text data containing the negative information from the subset acquired by the second subset acquiring means (1021). Note that the first text data extracting means (1012) may include the function of the second text data extracting means (1022). The second text data extracting means (1022) can execute Blocks 604, 605, and 606 illustrated in FIG. 6. In the dangerous expression detecting phase, the second dangerous expression extracting means (1023) detects that the expression that can be the dangerous expression extracted by the first dangerous expression extracting means (1013) exists in the subset of text data acquired by the second subset acquiring means (1021) or the text data extracted by the second text data extracting means (1022). Note that the first dangerous expression extracting means (1013) may include the function of the second dangerous expression extracting means (1023). The second dangerous expression extracting means (1023) can execute Blocks 607 and 608 illustrated in FIG. 6.

Based on the fact that the expression that can be the dangerous expression exists, the particular process executing means (1024) can execute at least one of the following processes: stop or suspend transmission or upload of the text data to be analyzed onto the network; display, on the screen, an indication that the text data to be analyzed contains the dangerous expression; transmit a message indicating that the text data to be analyzed contains the dangerous expression, to an electronic apparatus of a user that provides the analysis target text; and display, on the screen, an indication of the particular theme and the number of times of appearance of the expression that can be the dangerous expression. The particular process executing means (1024) can execute Block 609 illustrated in FIG. 6.

FIG. 11 is a diagram illustrating an example of functional blocks of a second electronic apparatus (1101) having the hardware configuration illustrated in FIG. 1, the second electronic apparatus (1101) executing the processing of the dangerous expression detecting phase according to various embodiments. The second electronic apparatus (1101) includes second subset acquiring means (1121), second text data extracting means (1122), second dangerous expression extracting means (1123), and particular process executing means (1124). In the dangerous expression detecting phase, the second subset acquiring means (1121) acquires a subset of text data associated with the particular theme from the text data to be analyzed. The second subset acquiring means (1121) can execute Blocks 602 and 603 illustrated in FIG. 6.

In the dangerous expression detecting phase, the second text data extracting means (1122) extracts text data containing the negative information from the subset acquired by the second subset acquiring means (1021). The second text data extracting means (1122) can execute Blocks 604, 605, and 606 illustrated in FIG. 6. In the dangerous expression detecting phase, the second dangerous expression extracting means (1123) detects that the expression that can be the dangerous expression extracted by the first dangerous expression extracting means (1013) exists in the subset of text data acquired by the second subset acquiring means (1021) or the text data extracted by the second text data extracting means (1022). The second dangerous expression extracting means (1123) can execute Blocks 607 and 608 illustrated in FIG. 6.

Based on the fact that the expression that can be the dangerous expression exists, the particular process executing means (1124) can execute at least one of the following processes: stop or suspend transmission or upload of the text data to be analyzed onto the network; display, on the screen, an indication that the text data to be analyzed contains the dangerous expression; transmit a message indicating that the text data to be analyzed contains the dangerous expression, to an electronic apparatus of a user that provides the analysis target text; and display, on the screen, an indication of the particular theme and the number of times of appearance of the expression that can be the dangerous expression. The particular process executing means (1124) can execute Block 609 illustrated in FIG. 6.

Various embodiments may be a system, a method, and/or a computer program product. The computer program product may include a computer readable storage medium (or media) having computer readable program instructions thereon for causing a processor to carry out aspects of various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of various embodiments. Aspects of various embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises on article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of various embodiments. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of various embodiments.

What is claimed is:

1. A method for detecting a dangerous expression based on a particular theme, comprising:
   acquiring, by a first electronic apparatus, from text data for learning, a first subset of the text data for learning associated with the particular theme and with particular time period information;
   extracting second text data containing negative information, based on an appearance of at least one negative word, from the acquired first subset of the text data for learning;
   extracting a first at least one word different from the at least one negative word and having a high correlation with the extracted second text data;
   determining that the extracted first at least one word different from the at least one negative word is part of the dangerous expression based on the particular theme and creating a learned learning model associating the dangerous expression to the particular theme;
   wherein the dangerous expression includes a co-occurrence expression comprising the first at least one word and a second word such that a first product divided by a second product is greater than one, wherein the first product comprises a first number of documents in the text data for learning multiplied by a second number of documents containing both the first at least one word and the second word in the first subset of the text data for learning, wherein the second product comprises a third number of documents in the first subset of the text data for learning multiplied by a fourth number of documents containing both the first at least one word and the second word in the text data for learning;
   acquiring, by a second electronic apparatus, a second subset of text data associated with the particular theme from text data to be analyzed;
   detecting that the dangerous expression determined to be the dangerous expression by the learned learning model exists in the second subset of text data acquired from the text data to be analyzed;
   displaying, on a screen, an indication that the second subset of text data acquired from the text data to be analyzed contains the dangerous expression; and
   posting, to a social networking site, a modified version of the second subset of text data in response to the indication that the second subset of text data contains the dangerous expression.

2. The method according to claim 1, further comprising performing, by the second electronic apparatus:
   extracting third text data containing negative information from the second subset of text data acquired from the text data to be analyzed, wherein the detecting that the dangerous expression exists in the second subset of text data acquired from the text data to be analyzed includes detecting that the dangerous expression exists in the third text data extracted from the text data to be analyzed.

3. The method according to claim 1, further comprising performing, based on the dangerous expression existing in the text data to be analyzed:
   stopping or suspending transmission or upload of the text data to be analyzed onto a network;
   transmitting a message indicating that the text data to be analyzed contains the dangerous expression to an electronic apparatus of a user that has provided the text data to be analyzed; and
   displaying, on the screen, an indication of the particular theme and a number of times of appearance of the dangerous expression.

4. The method according to claim 1, wherein detecting that the dangerous expression exists in the text data to be analyzed further includes extracting the particular theme.

5. The method according to claim 1, wherein the extracting the second text data containing the negative information comprises:
   identifying at least one word that falls under the negative information in the acquired first subset of text data for learning; and
   extracting the second text data containing the identified at least one word.

6. The method according to claim 5, wherein identifying the at least one word that falls under the negative information is performed using a negative information dictionary including words and phrases determinable as the negative information.

7. The method according to claim 1, wherein extracting the second text data containing the negative information comprises extracting the second text data containing at least one word that falls under the negative information, from the acquired first subset of text data using a learned machine learning model.

8. The method according to claim 1, wherein acquiring the second subset of text data comprises identifying text data associated with the particular theme using a theme identifying dictionary including words and phrases used for the particular theme.

9. The method according to claim 8, wherein acquiring the second subset of text data comprises:
   identifying, as text data associated with the particular theme, a range of a predetermined number of characters or a predetermined number of words before and after at least one word that exists in the text data for learning and is included in the theme identifying dictionary.

10. The method according to claim 8, wherein acquiring the second subset of text data comprises:
    identifying that a same sentence, paragraph, item, or document including text data contains at least one word included in the theme identifying dictionary.

11. The method according to claim 1, wherein acquiring the second subset of text data comprises identifying text data associated with the particular theme from the text data for learning using a learned learning model.

12. The method according to claim 1, wherein acquiring the second subset of text data comprises acquiring the second subset of text data associated with the particular theme by:
   identifying text data associated with the particular theme using a theme identifying dictionary including words and phrases used for the particular theme; and
   identifying text data associated with the particular theme from the text data for learning, using a learned learning model.

13. The method according to claim 1, wherein acquiring the second subset of text data comprises acquiring the second subset of text data associated with the particular theme by:
   identifying text data associated with the particular theme from the text data for learning, using a learned learning model; and
   identifying text data associated with the particular time period information.

14. The method according to claim 1, wherein acquiring the second subset of text data comprises acquiring the second subset of text data associated with the particular theme by:
   identifying text data associated with the particular theme using a theme identifying dictionary including words and phrases used for the particular theme; and
   identifying text data associated with the particular time period information.

15. The method according to claim 1, wherein acquiring the second subset of text data comprises acquiring the second subset of text data associated with the particular theme, by performing a set operation on the text data associated with the particular theme and the text data associated with the particular time period information.

16. The method according to claim 1, further comprising:
   outputting a modified version of the text data to be analyzed in response to the indication that the text data to be analyzed contains the dangerous expression, wherein the modified version of the text data to be analyzed is generated based on user input.

17. A computer program product for detecting a dangerous expression based on a particular theme, the computer program product comprising a computer readable storage medium, wherein the computer readable storage medium does not comprise a transitory signal per se, and wherein the computer readable storage medium has program instructions embodied therewith, the program instructions executable by a processor to cause the processor to:
   acquire, from text data for learning, a first subset of the text data for learning associated with the particular theme and with particular time period information;
   extract second text data containing negative information from the acquired first subset of the text data for learning based on an appearance of at least one negative word;
   extract a first at least one word different from the at least one negative word and having a high correlation with the extracted second text data;
   determine that the extracted first at least one word different from the at least one negative word is part of the dangerous expression based on the particular theme and creating a learned learning model associating the dangerous expression to the particular theme;
   wherein the dangerous expression includes a co-occurrence expression comprising the first at least one word and a second word such that a first product divided by a second product is greater than one, wherein the first product comprises a first number of documents in the text data for learning multiplied by a second number of documents containing both the first at least one word and the second word in the first subset of the text data for learning, wherein the second product comprises a third number of documents in the first subset of the text data for learning multiplied by a fourth number of documents containing both the first at least one word and the second word in the text data for learning;
   acquire a second subset of text data associated with the particular theme from text data to be analyzed;
   detect that the dangerous expression determined to be the dangerous expression by the learned learning model exists in the second subset of text data acquired from the text data to be analyzed;
   display, on a screen, an indication that the second subset of text data acquired from the text data to be analyzed contains the dangerous expression; and
   post, to a social networking site, a modified version of the second subset of text data in response to the indication that the second subset of text data contains the dangerous expression.

18. A computer system for detecting a dangerous expression based on a particular theme, the system comprising:
   a memory; and
   a processor, communicatively coupled to said memory, the computer system configured to perform a method comprising:
   acquiring, from text data for learning, a first subset of the text data for learning associated with the particular theme and with particular time period information;
   extracting second text data containing negative information from the acquired first subset of the text data for learning based on an appearance of at least one negative word;
   extracting a first at least one word different from the at least one negative word and having a high correlation with the extracted second text data;
   determining that the extracted first at least one word different from the at least one negative word is part of the dangerous expression based on the particular theme and creating a learned learning model associating the dangerous expression to the particular theme;
     wherein the dangerous expression includes a co-occurrence expression comprising the first at least one word and a second word such that a first product divided by a second product is greater than one, wherein the first product comprises a first number of documents in the text data for learning multiplied by a second number of documents containing both the first at least one word and the second word in the first subset of the text data for learning, wherein the second product comprises a third number of documents in the first subset of the text data for learning multiplied by a fourth number of documents containing both the first at least one word and the second word in the text data for learning;
   acquiring a second subset of text data associated with the particular theme from text data to be analyzed;
   detecting that the dangerous expression determined to be the dangerous expression by the learned learning model exists in the second subset of text data acquired from the text data to be analyzed;

displaying, on a screen communicatively coupled to the memory and the processor, an indication that the second subset of text data acquired from the text data to be analyzed contains the dangerous expression; and posting, to a social networking site, a modified version of the second subset of text data in response to the indication that the second subset of text data contains the dangerous expression.

* * * * *